United States Patent [19]
Ohmori

[11] Patent Number: 6,118,981
[45] Date of Patent: Sep. 12, 2000

[54] WIRELESS LOCAL LOOP SYSTEM FOR RADIO COMMUNICATION BETWEEN CENTRAL TELEPHONE EXCHANGE AND FIXED SUBSCRIBER

[75] Inventor: Tadashi Ohmori, Tokyo, Japan

[73] Assignee: Matsushita Electric Industrial Co., Ltd., Osaka, Japan

[21] Appl. No.: 09/081,569

[22] Filed: May 19, 1998

[30] Foreign Application Priority Data

May 23, 1997 [JP] Japan ..................................... 9-148439

[51] Int. Cl.[7] .................................................. H04B 17/00
[52] U.S. Cl. ............................... 455/67.1; 455/9; 455/423
[58] Field of Search ............................. 455/4.1, 5.1, 6.3, 455/423, 425, 9, 67.1, 67.4, 67.5, 560, 424

[56] References Cited

U.S. PATENT DOCUMENTS 5,603,095  2/1997  Uola ......................................... 455/67.1
5,913,176  6/1999  Barabash ................................. 455/560

FOREIGN PATENT DOCUMENTS 4319843  11/1992  Japan .
6141073  5/1994  Japan .

*Primary Examiner*—Lee Nguyen
*Assistant Examiner*—Marceau Milord
*Attorney, Agent, or Firm*—Lowe Hauptman Gopstein Gilman & Berner

[57] ABSTRACT

To ascertain in a pseudo-incoming call sequence whether or not a fixed subscriber unit of a user is set to an operation condition to wait for an incoming call, when a pseudo-incoming call is transmitted from a pseudo-incoming call outputting unit of a base station managing apparatus to the fixed subscriber unit through a wireless base station and a radio communication path, the fixed subscriber unit outputs an incoming call response signal to the base station managing apparatus through the wireless base station. Therefore, the base station managing apparatus can recognize that the fixed subscriber unit is set to an operation condition. Thereafter, to prevent a telephone connected with the fixed subscriber unit outputting a ringer sound, in place of a ringer sound urging signal in an incoming call sequence, a sequence interrupting signal is output from an incoming call sequence interrupting unit of the base station managing apparatus to the fixed subscriber unit through the wireless base station. Therefore, the operation condition of the fixed subscriber unit can be recognized in the base station managing apparatus without bothering the user.

8 Claims, 24 Drawing Sheets

| PR | UW | WIRELESS BASE STATION IDENTIFICATION CODE | CONTROL INFORMATION | CRC |

WIRELESS LOCAL LOOP SYSTEM FOR RADIO COMMUNICATION BETWEEN CENTRAL TELEPHONE EXCHANGE AND FIXED SUBSCRIBER

BACKGROUND OF THE INVENTION

1. Field of the Invention

The present invention relates generally to a wireless local loop system in which a radio communication between a central telephone exchange and a subscriber operating a fixed subscriber unit is performed, and more particularly to a wireless local loop system in which the central telephone exchange can check whether or not the fixed subscriber unit is set to an operation condition.

2. Description of the Related Art

In cases where any wire telephone circuit network is not installed in general homes and offices in specific countries like developing countries, a telephone communication system called a wireless local loop system has been recently adapted, in place of a wire telephone circuit system using a metal wire, to use telephones in the general homes and offices. In this wireless local loop system, a wireless base station is arranged in (or near) a central telephone exchange, the wireless base station and the central telephone exchange are connected with each other through a wire circuit or a wireless circuit, a fixed subscriber unit connected with a telephone is arranged in each home or office, and a radio communication is performed between the fixed subscriber unit and the wireless base station connected with the central telephone exchange through the wire circuit or the wireless circuit.

2.1. PREVIOUSLY PROPOSED ART

FIG. 1 schematically shows an entire configuration of a conventional wireless local loop system used for a general home.

As shown in FIG. 1, a conventional wireless local loop system 11 is composed of:

- a telephone 14 arranged in user's house 13 for receiving incoming wireless (or telephonic) data and outputting outgoing wireless (or telephonic) data;
- a wire telephone circuit network 24 for transmitting the incoming wireless data to the telephone 14 and transmitting the outgoing wireless data output from the telephone 14 to a communication partner;
- a fixed subscriber unit 12, connected with the telephone 14 through a telephone cord 15 and arranged on a wall of the house 13, for receiving the incoming wireless data transmitted from the wire telephone circuit network 24 through a radio communication path, transferring the incoming wireless data to the telephone through the telephone cord 15, receiving the outgoing wireless data from the telephone 14 through the telephone cord 15 and outputting the outgoing wireless data to the radio communication path;
- an antenna 16 arranged on a roof of the house 13 to be connected with the fixed subscriber unit 12 through an antenna line 17;
- a central telephone exchange 18;
- a wireless base station 19, connected with a plurality of fixed subscriber units including the fixed subscriber unit 12 through a radio communication path, for receiving the incoming wireless data transmitted from the wire telephone circuit network 24 through an antenna 21, transmitting the incoming wireless data to the fixed subscriber unit 12 through the antenna 21 and the radio communication path, receiving the outgoing wireless data from the fixed subscriber unit 12 through the radio communication path and the antenna 21 and transmitting the outgoing wireless data to the wire telephone circuit network 24 through the antenna 21;
- a support 20 holding the wireless base station 19 outside the central telephone exchange 18;
- a base station managing unit 22, connecting a plurality of wireless base stations including the wireless base station 19 and the wire telephone circuit network 24 through a wire cable 23 and arranged in the central telephone exchange 18, for transmitting the incoming wireless data received by the wireless base station 19 to the wire telephone circuit network 24 through the wire cable 23, transmitting the outgoing wireless data received from the wire telephone circuit network 24 to the wireless base station 19 through the wire cable 23 and managing the wireless base station 19 to make the wireless base station 19 perform an incoming call sequence with the fixed subscriber unit 12 and to perform a telephonic communication between the user and the communication partner, an incoming call being transmitted from the base station managing apparatus 22 to the fixed subscriber unit 12 through the wireless base station 19 in the incoming call sequence, an incoming call response signal indicating the reception of the incoming call being transmitted from the fixed subscriber unit 12 to the base station managing apparatus 22 through the wireless base station 19 in the incoming call sequence, and an incoming call signal being transmitted from the fixed subscriber unit 12 to the telephone 14 in the incoming call sequence to make the telephone 14 output a ringer sound; and
- a wire cable 23 connecting the wireless base station 19 and the base station managing unit 22 of the central telephone exchange 18.

FIG. 2 is a block diagram of the fixed subscriber unit 12. As shown in FIG. 2, the fixed subscriber unit 12 is composed of

- an antenna connector 31 connecting the fixed subscriber unit 12 and the antenna 16 through the antenna line 17;
- a wireless circuit 32 having a synthesizer 33 for receiving incoming wireless data from the wireless base station 19 through a communication channel or a control channel at a reception timing, modulating outgoing wireless data with a carrier wave generated by the synthesizer 33 and transmitting the modulated outgoing wireless data to the wireless base station 19 as the outgoing wireless data through the communication channel or the control channel at a transmission timing;
- a wireless control unit 34 for controlling the synthesizer 33 to specify a frequency of the carrier wave, controlling the reception timing and the transmission timing of the wireless circuit 32, and measuring a receive electric field level of an informative signal periodically received by the wireless circuit 32;
- a channel coder-decoder (codec) unit 35 for decoding the incoming wireless data received by the wireless circuit 32, coding the outgoing wireless data and transferring the outgoing wireless data to the wireless circuit 32;
- an information memory 36 made of a non-volatile memory for storing wireless base station information required to specify the wireless base station 19 from the plurality of the wireless base stations;

a control unit 37 having a temporary memory for controlling the wireless control unit 34, storing the receive electric field level of the informative signal measured by the wireless control unit 34 in the temporary memory, processing the incoming wireless data transmitted at the control channel and transferred from the channel codec unit 35 and producing the outgoing wireless data planned to be transmitted at the control channel;

a telephone circuit interface unit 38 having an audio codec circuit, a telephone circuit, an incoming signal generating circuit, a telephone off-hook detecting circuit and a telephone dial detecting circuit for receiving the incoming wireless data transmitted at the communication channel and transferred from the channel codec unit 35, processing the incoming wireless data transferred from the telephone 14 in the audio codec circuit to produce a voice signal of a communication partner, processing a voice signal of the user to the outgoing wireless data in the audio codec circuit, transmitting the voice signal of the communication partner to the telephone 14 and transferring the outgoing wireless data to the channel codec unit 35;

a telephone cord connector 39 connecting the telephone 14 and the telephone circuit interface unit 38 through the telephone cord 15;

an electric power circuit 40 for supplying an electric power to the wireless circuit 32, the wireless control unit 34, the channel codec unit 35, the information memory 36, the control unit 37 and the telephone circuit interface unit 38; and a direct connection type or a separation type electric power cord 41 connecting the electric power circuit 40 and a power supply.

FIG. 3 is a block diagram of the wireless base station 19. As shown in FIG. 3, the wireless base station 19 is composed of a wireless circuit 51 having a synthesizer 52 for receiving the outgoing wireless data from the fixed subscriber unit 12 at a reception timing, demodulating the outgoing wireless data by the synthesizer 52, modulating the incoming wireless data with a carrier wave generated by the synthesizer 52 and transmitting the modulated incoming wireless data to the fixed subscriber unit 12 as the incoming wireless data at a transmission timing;

a wireless control unit 53 for controlling the synthesizer 52 to specify a frequency of the carrier wave, controlling the reception timing and the transmission timing of the wireless circuit 51, and measuring a receive electric field level of the outgoing wireless data received by the wireless circuit 51;

a channel codec unit 54 for coding the incoming wireless data, transferring the incoming wireless data to the wireless circuit 51 and decoding the outgoing wireless data transferred from the wireless circuit 51;

an information memory 55 made of a non-volatile memory for storing various pieces of information and a wireless base station identification code indicating an enterpriser of the wireless base station 19 required to transmit the incoming wireless data to the plurality of fixed subscriber units including the fixed subscriber unit 12;

a control unit 56 having a temporary memory for controlling the wireless control unit 53, storing the receive electric field level of the outgoing wireless data measured by the wireless control unit 53 in the temporary memory, processing the outgoing wireless data transmitted at the control channel and transferred from the channel codec unit 54 and producing the incoming wireless data planned to be transmitted at the control channel;

a base station managing apparatus interface unit 57 for receiving the outgoing wireless data transmitted at the communication channel from the channel codec unit 54, transmitting the outgoing wireless data to the base station managing apparatus 22 and transferring the incoming wireless data transmitted from the base station managing apparatus 22 to the channel codec unit 54;

a base station cord connector 58 connecting the base station managing unit 22 and the base station managing apparatus interface unit 57 through the wire cable 23;

an electric power circuit 59 for supplying an electric power to the wireless circuit 51, the wireless control unit 53, the channel codec unit 54, the information memory 55, the control unit 56 and the base station managing apparatus interface unit 57; and a direct connection type or a separation type electric power cord 60 connecting the electric power circuit 59 and a power supply.

In the above configuration of the conventional wireless local loop system 11, a telephone calling, an incoming call and a telephone conversation are described.

The wireless base station 19 periodically transmits an informative signal of a constant frequency at a logical control channel (LCCH) to a receiving station such as a mobile station of a time division multiple access/time division duplex (TDMA/TDD) type personal handy-phone system (PHS) or the fixed subscriber unit 12 of the conventional wireless local loop system 11 in a communication waiting period in the same manner as a general PHS public base station. In detail, as shown in FIG. 3, when the electric power cord 60 is connected with a power supply, an operation of the base station managing apparatus interface unit 57 is started under the control of the control unit 56, information (such as an identification number of the wireless base station 19) required to output an informative signal is down-loaded from the base station managing unit 22 to the control unit 56 through the base station managing apparatus interface unit 57, the control unit 56 controls the wireless control unit 53 to set a frequency of the carrier wave generated by the synthesizer 52 to a prescribed control frequency, and the control unit 56 controls the channel codec unit 54 to periodically transmit an informative signal modulated with the carrier wave of the prescribed control frequency from the wiring circuit 51 through the antenna 21 at the logical control channel.

Also, in the fixed subscriber unit 12, as shown in FIG. 2, when the electric power cord 41 is connected with a power supply, the fixed subscriber unit 12 receives the informative signal transmitted from the wireless base station 19 which is specified by wireless base station information stored in the information memory 36. Here, the wireless base station information is composed of a control carrier number indicating the number of the carrier wave and a system identification code indicating an enterpriser identification code of a wireless base station. In detail, the control unit 37 controls the wireless control unit 34 to set a frequency of the carrier wave generated by the synthesizer 33 to a particular frequency corresponding to the control carrier number of the wireless base station information, the control unit 37 controls the channel codec unit 35 to set the wireless circuit 32 in a continuous receiving condition, and the informative signal transmitted from the wireless base station 19, which is specified by the system identification code of the wireless base station information, is retrieved by the wireless circuit 32 set in the continuous receiving condition.

FIG. 4 shows a format of a burst of informative signal transmitted from the wireless base station 19. The burst of informative signal is used as a control carrier wave for the PHS and is prescribed by a standard regulation Research and Development Center for Radio Systems (RCR) STD-28 for the PHS.

As shown in FIG. 4, the informative signal transmitted in a burst is composed of a preamble PR, a unique word UW used for synchronization, a wireless base station identification code indicating an enterpriser of the wireless base station 19 from which the informative signal is transmitted, control information and cyclic redundancy check (CRC) information arranged in that order. The wireless base station identification code is expressed by 42 bits, and the system identification code is expressed by 9 bits placed in the top of the 42 bits.

Next, a position registration for registering a position of the telephone 14 in the base station managing unit 22 is described. The position registration is first required of a telephone user when a user has the telephone 14 installed in the house 13 for the first time.

FIG. 5 shows a sequence of the position registration prescribed in the RCR STD-28.

As shown in FIG. 5, when a user picks up a receiver of the telephone 14 (an off-hook operation) and dials a certain number to call up the central telephone exchange 18, the control unit 37 of the fixed subscriber unit 12 detects an off-hook signal transmitted from the telephone 14 through the telephone circuit interface unit 38, the control unit 37 received the off-hook signal as a call request, the wireless circuit 32 is set to an informative signal retrieval condition, and an informative signal is received in the wireless circuit 32. When the system identification code of the wireless base station identification code of the informative signal agrees with the system identification code of the wireless base station information stored in the information memory 36, the wireless base station 19, from which the informative signal is transmitted, is captured by the channel codec unit 35 under the control of the control unit 37, and a position registering sequence prescribed in the RCR STD-28 is performed by the fixed subscriber unit 12 in the same manner as in a mobile station of the PHS. In detail, the wireless circuit 32 outputs a link channel setting request to the wireless base station 19 at a control channel under the control of the control unit 37. When the link channel setting request message is received by the wireless base station 19, the wireless base station 19 transmits a link channel allocation message to the fixed subscriber unit 12. Thereafter, when the fixed subscriber unit 12 receives the link channel allocation message, the change from a radio communication at the control channel to a radio communication at a talking channel is performed in the fixed subscriber unit 12 under the control of the control unit 37 and the channel codec unit 35, and the change from a radio communication at the control channel to a radio communication at the talking channel is performed in the wireless base station 19 under the control of the control unit 56 and the channel codec unit 54. Thereafter, a sequence between the fixed subscriber unit 12 and the wireless base station 19 at a first layer, a sequence between the fixed subscriber unit 12 and the wireless base station 19 at a second layer and a sequence between the fixed subscriber unit 12 and the wireless base station 19 at a third layer prescribed in open systems interconnection (OSI) of the International Standardization Organization (ISO) are set in that order through a radio communication path under the control of the control unit 37, the channel codec unit 35, the control unit 56 and the channel codec unit 54, and the fixed subscriber unit 12 and the wireless base station 19 are set to a waiting operation for a position registration. When the user sends a position registration request to the wireless base station 19, position registration information of the fixed subscriber unit 12 included in the position registration request is transmitted from the wireless base station 19 to the base station managing unit 22, the reception of the position registration request is informed the fixed subscriber unit 12, and the sequence at the third layer, the sequence at the second layer and the sequence at the first layer are released in that order. Therefore, the fixed subscriber unit 12 is set to a telephone call waiting condition to receive an incoming call.

Next, a sequence of a telephone call for calling up a communication partner is described.

FIG. 6 shows a sequence of a telephone call prescribed in the RCR STD-28.

As shown in FIG. 6, after the position registration, when the user picks up a receiver of the telephone 14 (an off-hook operation), the control unit 37 of the fixed subscriber unit 12 detects an off-hook signal transmitted from the telephone 14 through the telephone circuit interface unit 38. Thereafter, a dial tone generating circuit of the telephone circuit interface unit 38 is operated under the control of the control unit 37, and a dial tone is output to the telephone 14 when the user dials a communication partner. Also, each dial number specified by the user's dialing is transmitted from the telephone 14 to the fixed subscriber unit 12, and the specified dial number is detected by the control unit 37 through the telephone circuit interface unit 38. The control unit 37 waits for a next dial number input by the user for a dial input period. When any dial number is not received in the control unit 37 within the dial input period, a time-out is judged, and a telephone call sequence prescribed in the RCR STD-28 is performed. In detail, a telephone request is transmitted from the telephone 14 to the fixed subscriber unit 12, a link channel setting request is transmitted from the fixed subscriber unit 12 to the wireless base station 19 at the control channel under the control of the control unit 37, a link channel allocation message transmitted from the wireless base station 19 is received in the fixed subscriber unit 12, the change from the control channel to the talking channel is performed in the fixed subscriber unit 12 under the control of the control unit 37 and the channel codec unit 35, and the change from the control channel to the talking channel is performed in the wireless base station 19 under the control of the control unit 56 and the channel codec unit 54. Thereafter, a sequence between the fixed subscriber unit 12 and the wireless base station 19 at a first layer and a sequence between the fixed subscriber unit 12 and the wireless base station 19 at a second layer are set at the talking channel in that order under the control of the control unit 37, the channel codec unit 35, the control unit 56 and the channel codec unit 54. Thereafter, in the setting of a sequence between the fixed subscriber unit 12 and the wireless base station 19 at a third layer, a call setting message is transmitted from the fixed subscriber unit 12 to the wireless base station 19 at the talking channel under the control of the control unit 37 and the channel codec unit 35, the call setting message is transmitted from the wireless base station 19 to the base station managing unit 22 under the control of the control unit 56 and the channel codec unit 54, and a call setting receiving signal indicating the reception of the call setting message is transmitted from the base station managing unit 22 to the fixed subscriber unit 12 through the wireless base station 19. Thereafter, when the wireless base station 19 receives a call message transmitted from the base station managing unit 22, the wireless base station 19 transmits the call message to the fixed subscriber unit 12 under the control of the control unit 56 and the channel codec unit 54. Thereafter, when the control unit 37 judges that the control unit 37 receives the call message through the wireless circuit 32 and the channel codec unit 35, the control unit 37 control the telephone circuit interface unit 38 to start the operation of an adaptive differential pulse-code modulation (ADPCM) codec unit of the unit 38. Therefore, a ring back tone denoting a call tone for the communication partner is transmitted from the central telephone exchange 18 to the telephone 14 through the wireless base station unit 19 and the fixed subscriber unit 12, and the user can hears the ring back tone. Thereafter, when the communication partner picks up a receiver of his telephone in response to the ring back tone, the user can talks with the communication partner though the telephone 14.

Next, a sequence of an incoming call for receiving a telephone call transmitted from a communication partner is described.

FIG. 7 shows a sequence of an incoming call prescribed in the RCR STD-28.

As shown in FIG. 7, when an incoming call of a communication partner is received in the base station managing unit 22 of the central telephone exchange 18, the wireless base station 19 receives information of the incoming call from the base station managing unit 22, the control unit 56 of the wireless base station 19 controls the channel codec unit 54 to set an incoming call message indicating the reception of the incoming call in the unit 54, the incoming call message is transmitted from the wireless circuit 51 to the fixed subscriber unit 12 as an informative signal, and an incoming call sequence between the fixed subscriber unit 12 and the wireless base station 19 is performed under the control of the control unit 37, the channel codec unit 35, the control unit 56 and the channel codec unit 54.

In detail, a link channel setting request is transmitted to the wireless base station 19 at the control channel under the control of the control unit 37, a link channel allocation message transmitted from the wireless base station 19 is received in the fixed subscriber unit 12, the change from the control channel to the talking channel is performed in the fixed subscriber unit 12 and the wireless base station 19 under the control of the control unit 37, the channel codec unit 35, the control unit 56 and the channel codec unit 54. Thereafter, a sequence at a first layer and a sequence at a second layer are set at the talking channel in that order in the same manner as in the position registering sequence and the telephone call sequence. Thereafter, in the setting of a sequence at a third layer, an incoming call response signal indicating the reception of the incoming call message is transmitted from the fixed subscriber unit 12 to the wireless base station 19 at the talking channel under the control of the control unit 37 and the channel codec unit 35, and the incoming call response signal is again transmitted from the wireless base station 19 to the base station managing unit 22 under the control of the control unit 56 and the channel codec unit 54.

Thereafter, a ringer sound urging signal is transmitted from the base station managing apparatus 22 to the fixed subscriber unit 12 through the wireless base station 19, the control unit 37 of the fixed subscriber unit 12 controls the telephone circuit interface unit 38 according to the ringer sound urging signal to start the operation of an incoming call signal generating circuit of the unit 38, the incoming call signal is transmitted to the telephone 14, and a ringer sound is output from the telephone 14. Therefore, the incoming call sequence is successfully completed, and the telephone 14 informs the user of the incoming call.

Also, a call message indicating the outputting of the ringer sound is transmitted from the fixed subscriber unit 12 to the base station managing unit 22 through the wireless base station 19. Therefore, the base station managing unit 22 can be informed that the fixed subscriber unit 19 is functioning without any trouble.

Thereafter, a response operation for the incoming call is performed. In detail, when the user picks up a receiver of the telephone 14 (off-hook operation), the control unit 37 of the fixed subscriber unit 12 detects an off-hook signal transmitted from the telephone 14 through the telephone circuit interface unit 38, and a response message is transmitted from the control unit 37 to the wireless base station unit 19 through the channel codec unit 35, the wireless circuit 32 and a radio communication path. When the response message transmitted from the fixed subscriber unit 12 is received in the control unit 56 of the wireless base station unit 19 through the wireless circuit 51 and the channel codec unit 54, an operation of the channel codec unit 54 is started under the control of the control unit 56, and a response confirming message is transmitted from the channel codec unit 54 to the fixed subscriber unit 12 through the wireless circuit 51.

Thereafter, when the response confirming message is received in the control unit 37 through the wireless circuit 32 and the channel codec unit 35, the response for the incoming call is successfully completed, so that the user can talk with the communication partner through the telephone 14.

2.2. PROBLEMS TO BE SOLVED BY THE INVENTION

However, though the position registration for a portable station in the PHS is intermittently performed because the position of the portable station is movable, because the position registration for the fixed subscriber unit 12 is not intermittently performed in the above conventional wireless local loop system 11, even though the fixed subscriber unit 12 malfunctions, an operational condition that a radio communication between the wireless base station 19 and the fixed subscriber unit 12 cannot be performed cannot be checked in the base station managing unit 22 unless a telephone call from the fixed subscriber unit 12 or an incoming call to the fixed subscriber unit 12 is performed. For example, when a power supply to the electric power circuit 40 is stopped or a constitutional element of the fixed subscriber unit 12 is broken down, the fixed subscriber unit 12 cannot be operated, so that a radio communication between the wireless base station 19 and the fixed subscriber unit 12 cannot be performed.

To solve this problem, in cases where the conventional wireless local loop system 11 is manufactured by applying the personal handy-phone system or the PHS, a subscriber circuit test prescribed in the second version of the RCR STD-28 is performed for the fixed subscriber unit 12, and the operational condition of the fixed subscriber unit 12 is checked by the wireless base station 19. However, to perform this subscriber circuit test, it is required to restructure the base station managing unit 22, the wireless base station 19 and the fixed subscriber unit 12 for the purpose of adding a function of the subscriber circuit test to the base station managing unit 22, the wireless base station 19 and the fixed subscriber unit 12.

SUMMARY OF THE INVENTION

A first object of the present invention is to provide, with due consideration to the drawbacks of such a conventional wireless local loop system, a wireless local loop system in which an operational condition of a fixed subscriber unit in a radio communicative connection between the fixed subscriber unit and a wireless base station is checked by a base station managing unit without restructuring any of the wireless base station and the fixed subscriber unit.

A second object of the present invention is to provide a wireless local loop system in which a base station managing unit recognizes to what degree a functional condition of a fixed subscriber unit is set in a radio communicative connection between the fixed subscriber unit and a wireless base station while checking an operational condition of the fixed subscriber unit.

A third object of the present invention is to provide a wireless local loop system in which a radio communication for a fixed subscriber unit is automatically maintained at an excellent condition even though a functional condition of a wireless base station connected with the fixed subscriber unit is degraded.

A fourth object of the present invention is to provide a wireless local loop system in which a radio communication for a fixed subscriber unit is automatically maintained at an excellent condition during a conversation between a user of the fixed subscriber unit and a communication partner even though a functional condition of a wireless base station connected with the fixed subscriber unit is degraded.

A fifth object of the present invention is to provide a wireless local loop system in which a delay correction for a transmission timing of outgoing wireless data (or outgoing telephonic information) is automatically performed.

The first object is achieved by the provision of a wireless local loop system, comprising:

a telephone arranged in a house for receiving incoming telephonic information and outputting outgoing telephonic information;

a telephone circuit network for transmitting the incoming telephonic information to the telephone and transmitting the outgoing telephonic information output from the telephone to a communication partner;

a fixed subscriber unit, connected with the telephone through a telephone cord in the house, for receiving the incoming telephonic information transmitted from the telephone circuit network through a radio communication path, transferring the incoming telephonic information to the telephone through the telephone cord, receiving the outgoing telephonic information from the telephone through the telephone cord and outputting the outgoing telephonic information to the radio communication path;

a wireless base station for receiving the incoming telephonic information transmitted from the telephone circuit network, transmitting the incoming telephonic information to the fixed subscriber unit through the radio communication path, receiving the outgoing telephonic information from the fixed subscriber unit through the radio communication path and transmitting the outgoing telephonic information to the telephone circuit network; and a base station managing apparatus, connecting the wireless base station and the telephone circuit network through a wiring communication path, for transmitting the incoming telephonic information received by the wireless base station to the telephone circuit network through the wiring communication path, transmitting the outgoing telephonic information received from the telephone circuit network to the wireless base station through the wiring communication path and managing the wireless base station to make the wireless base station perform an incoming call sequence with the fixed subscriber unit and to perform a telephonic communication between the user and the communication partner, an incoming call being transmitted from the base station managing apparatus to the fixed subscriber unit through the wireless base station in the incoming call sequence, an incoming call response signal indicating the reception of the incoming call being transmitted from the fixed subscriber unit to the base station managing apparatus through the wireless base station in the incoming call sequence, an incoming call signal being transmitted from the fixed subscriber unit to the telephone in the incoming call sequence to inform the user of the incoming call, and the base station managing apparatus comprising:

pseudo-incoming call outputting means for outputting a pseudo-incoming call to the fixed subscriber unit through the wireless base station and the radio communication path to make the fixed subscriber unit output the incoming call response signal to the base station managing apparatus through the wireless base station in the same manner as in the incoming call sequence;

incoming call sequence interrupting means for outputting a sequence interrupting signal to the fixed subscriber unit through the wireless base station according to the incoming call response signal received by the base station managing apparatus to prevent the fixed subscriber unit outputting the incoming call signal to the telephone and to interrupt the incoming call sequence; and operational condition informing means for informing the telephone circuit network according to the incoming call response signal received by the base station managing apparatus that the fixed subscriber unit is normally operated to perform the telephonic communication.

In the above configuration, when a communication partner calls up a user, an incoming call is transmitted to the base station managing apparatus through the telephone circuit network, and an incoming call sequence is started. That is, the incoming call is transmitted to the fixed subscriber unit through the wireless base station. When the fixed subscriber unit receives the incoming call, the fixed subscriber unit and the wireless base station are connected with each other at a talking channel, and an incoming call response signal indicating the reception of the incoming call is transmitted from the fixed subscriber unit to the base station managing apparatus through the wireless base station. Thereafter, an incoming call signal is transmitted from the fixed subscriber unit to the telephone to inform the user of the incoming call. Therefore, the incoming call sequence is successfully completed, and the user can talk with the communication partner when the user picks up a receiver of the telephone.

In the present invention, in addition to the incoming call sequence, a pseudo-incoming call sequence is performed under the control of the base station managing apparatus to check an operation condition of the fixed subscriber unit without informing the user of any incoming call. That is, a pseudo-incoming call is output from the pseudo-incoming call outputting means to the fixed subscriber unit through the wireless base station though any incoming call is not transmitted from the telephone circuit network to the base station managing apparatus. Therefore, the fixed subscriber unit outputs an incoming call response signal to the base station managing apparatus through the wireless base station in the same manner as in the incoming call sequence. When the base station managing apparatus receives the incoming call response signal from the fixed subscriber unit, a sequence interrupting signal is output from the incoming call sequence interrupting means to the fixed subscriber unit through the wireless base station to prevent the fixed subscriber unit outputting an incoming call signal to the telephone. Therefore, the user is not informed of any incoming call as if the incoming call sequence is interrupted, and it is checked that the fixed subscriber unit is normally operated.

Thereafter, the operation condition of the fixed subscriber unit normally operated is informed the telephone circuit network by the operational condition informing means.

Accordingly, a telephone center controlling the telephone circuit network can check the operation condition of the fixed subscriber unit without informing the user of any incoming call on condition that any restructuring for the subscriber unit and the wireless base station is not required. Therefore, the control center can recognize whether or not the fixed subscriber unit is operated.

To achieve the second object, it is preferred that the fixed subscriber unit comprise:

wireless control means for measuring a receive electric field level of an informative signal transmitted from the wireless base station through the radio communication path;

functional condition storing means for storing the receive electric field level measured by the wireless control means as a functional condition of the fixed subscriber unit; and incoming call response message processing means for adding the functional condition of the fixed subscriber unit stored in the functional condition storing means to the incoming call response signal which is output from the fixed subscriber unit in response to the pseudo-incoming call, the incoming call response signal with the functional condition of the fixed subscriber unit being transmitted to the base station managing apparatus through the wireless base station.

In cases where a condition of a radio communication between the fixed subscriber unit and the wireless base station is excellent, a receive electric field level of an informative signal transmitted from the wireless base station to the fixed subscriber unit becomes high. Therefore, the receive electric field level of the informative signal indicates a functional condition of the fixed subscriber unit in a radio communicative connection between the fixed subscriber unit and the wireless base station.

In the above configuration, because the receive electric field level of the informative signal is measured by the wireless control means and is added to the incoming call response signal by the incoming call response message processing means when a pseudo-incoming call is output to the fixed subscriber unit by the pseudo-incoming call outputting means, the incoming call response signal with the functional condition of the fixed subscriber unit is transmitted to the base station managing apparatus. Therefore, the base station managing apparatus can recognize to what degree a functional condition of the fixed subscriber unit is set in a radio communicative connection between the fixed subscriber unit and a wireless base station while checking an operational condition of the fixed subscriber unit.

To achieve the third object, it is preferred that the wireless base station represent a plurality of wireless base stations connected with the base station managing apparatus, a first wireless base station and a second wireless base station are included in the wireless base stations, the first wireless base station is connected with the fixed subscriber unit through the radio communication path, the base station managing apparatus further comprise base station change judging and instructing means for judging whether or not a traffic density of radio communication lines for each of the wireless base stations is high and outputting a base station change instruction to the first wireless base station to instruct the first wireless base station to refuse a radio communicative connection with the fixed subscriber unit in cases where a traffic density of radio communication lines for the first wireless base station is high, the first wireless base station comprise link channel allocation refusing means for outputting a link channel allocation refusing message indicating the refusal of the allocation of a link channel to the fixed subscriber unit according to the base station change instruction transmitted from the base station change judging and instructing means not to perform a radio communicative connection with the fixed subscriber unit in cases where a link channel setting request transmitted from the fixed subscriber unit is received in the first wireless base station, and the fixed subscriber unit comprise wireless base station capturing means for capturing the second wireless base station according to the link channel allocation refusing message transmitted from the link channel allocation refusing means to perform a radio communicative connection with the second wireless base station, a traffic density of radio communication lines for the second wireless base station being low.

In the above configuration, a traffic density of radio communication lines for each of the wireless base stations is checked by the base station change judging and instructing means. In cases where a traffic density of radio communication lines for the first wireless base station, because a quality of a radio communication between the first wireless base station and the fixed subscriber unit is degraded, the base station change judging and instructing means outputs a base station change instruction to the first wireless base station to instruct the first wireless base station to refuse a radio communicative connection with the fixed subscriber unit.

Thereafter, when a link channel setting request transmitted from the fixed subscriber unit is received in the first wireless base station, the first wireless base station outputs a link channel allocation refusing message to the fixed subscriber unit according to the base station change instruction not to perform a radio communicative connection with the fixed subscriber unit. Therefore, the fixed subscriber unit captures the second wireless base station according to the link channel allocation refusing message because a traffic density of radio communication lines for the second wireless base station is low, and a radio communicative connection with the second wireless base station is set.

Accordingly, because a radio communicative connection between the particular fixed subscriber unit and the first wireless base station is canceled when a functional condition of the first wireless base station for the particular fixed subscriber unit is degraded and a radio communicative connection between the particular fixed subscriber unit and the second wireless base station is set, a radio communication for the particular fixed subscriber unit can be automatically maintained at an excellent condition.

To achieve the fourth object, it is preferred that the wireless base station represent a plurality of wireless base stations connected with the base station managing apparatus, a first wireless base station and a second wireless base station be included in the wireless base stations, the first wireless base station be connected with the fixed subscriber unit through the radio communication path, the base station managing apparatus further comprise base station change judging and instructing means for judging during a conversation between a user of the fixed subscriber unit and a communication partner whether or not a traffic density of radio communication lines for the first wireless base station is high and outputting a base station change instruction and identification information of the second wireless base station to the first wireless base station to instruct the first wireless base station to make the fixed subscriber unit change a radio communicative connection with the fixed subscriber unit to a radio communicative connection with the second subscriber unit in cases where a traffic density of radio communication lines for the first wireless base station is high, the first wireless base station comprise link channel setting instruction outputting means for outputting a link channel setting instruction and the identification information indicating the setting of a link channel with the second wireless base station to the fixed subscriber unit according to the base station change instruction and the identification information transmitted from the base station change judging and instructing means, and the fixed subscriber unit comprise radio communicative connection setting means for setting a radio communicative connection with the second wireless base station according to the link channel setting instruction and the identification information transmitted from the link channel setting instruction outputting means and disconnecting the first wireless base station from the fixed subscriber unit according to the link channel setting instruction.

In the above configuration, even though the recognition that the change of a communicative connection with the first wireless base station to a communicative connection with the second wireless base station is required for the fixed subscriber unit is performed by the base station change judging and instructing means of the base station managing apparatus during a conversation between a user of the fixed subscriber unit and a communication partner, a communicative connection between the first wireless base station and the fixed subscriber unit is automatically canceled, and a communicative connection between the second wireless base station and the fixed subscriber unit is automatically set.

Accordingly, a radio communication for the fixed subscriber unit can be automatically maintained at an excellent condition during a conversation between the user of the fixed subscriber unit and the communication partner even though a functional condition of the first wireless base station connected with the fixed subscriber unit is degraded.

To achieve the fifth object, it is preferred that the outgoing telephonic information be output from the fixed subscriber unit to the wireless base station at a transmission timing, the wireless base station comprise transmission timing adjusting information adding means for adding transmission timing adjusting information indicating the adjustment of the transmission timing for the outgoing telephonic information to the sequence interrupting signal output from the incoming call sequence interrupting means, and the fixed subscriber unit comprise transmission timing adjusting means for adjusting the transmission timing for the outgoing telephonic information according to the transmission timing adjusting information transmitted from the transmission timing adjusting information adding means with the sequence interrupting signal.

In cases where the fixed subscriber unit is distant from the wireless base station, a delay correction is required for a transmission timing of the outgoing wireless data transmitted from the fixed subscriber unit to the wireless base station. In the above configuration, transmission timing adjusting information indicating the adjustment of the transmission timing for the outgoing telephonic information is added to the sequence interrupting signal by the transmission timing adjusting information adding means when the sequence interrupting signal is output from the incoming call sequence interrupting means to the wireless base station. Thereafter, when the sequence interrupting signal with the transmission timing adjusting information is transmitted to the fixed subscriber unit, the transmission timing for the outgoing telephonic information is adjusted by the transmission timing adjusting means according to the transmission timing adjusting information.

Accordingly, because the transmission timing for the outgoing telephonic information can be adjusted according to convenience of the wireless base station, a delay correction for the transmission timing of the outgoing telephonic information can be automatically performed.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a wireless local loop system according to the present invention are described with reference to the drawings.

(First Embodiment)

Figure 8:
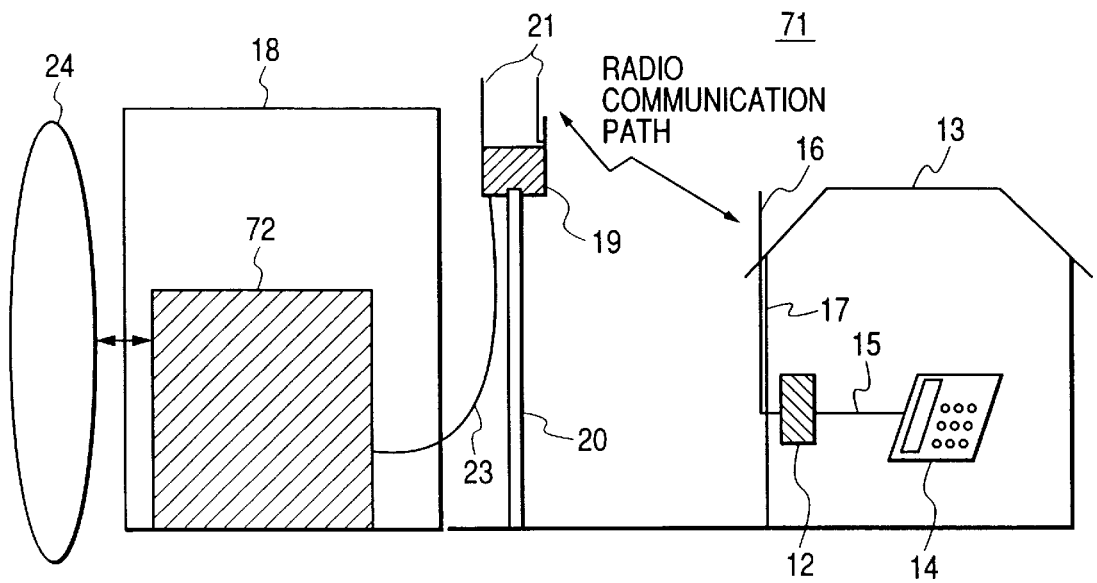
FIG. 8 schematically shows an entire configuration of a wireless local loop system according to a first embodiment of the present invention.

FIG. 8 schematically shows an entire configuration of a wireless local loop system according to a first embodiment of the present invention.

Figure 1:
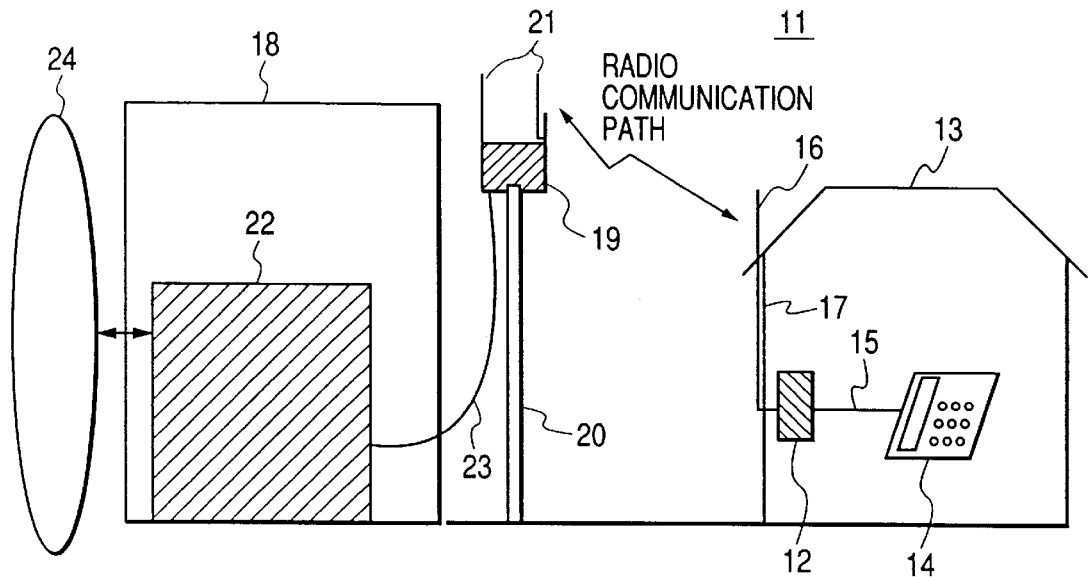
FIG. 1 schematically shows an entire configuration of a conventional wireless local loop system used for a general home.
Figure 2:
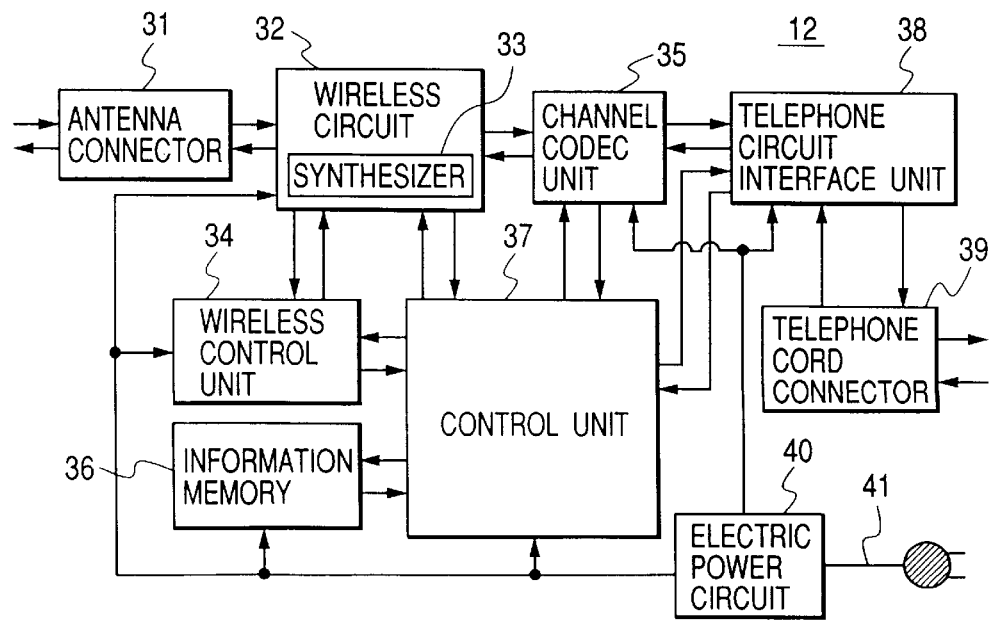
FIG. 2 is a block diagram of a fixed subscriber unit shown in FIG. 1.
Figures 3, 4:
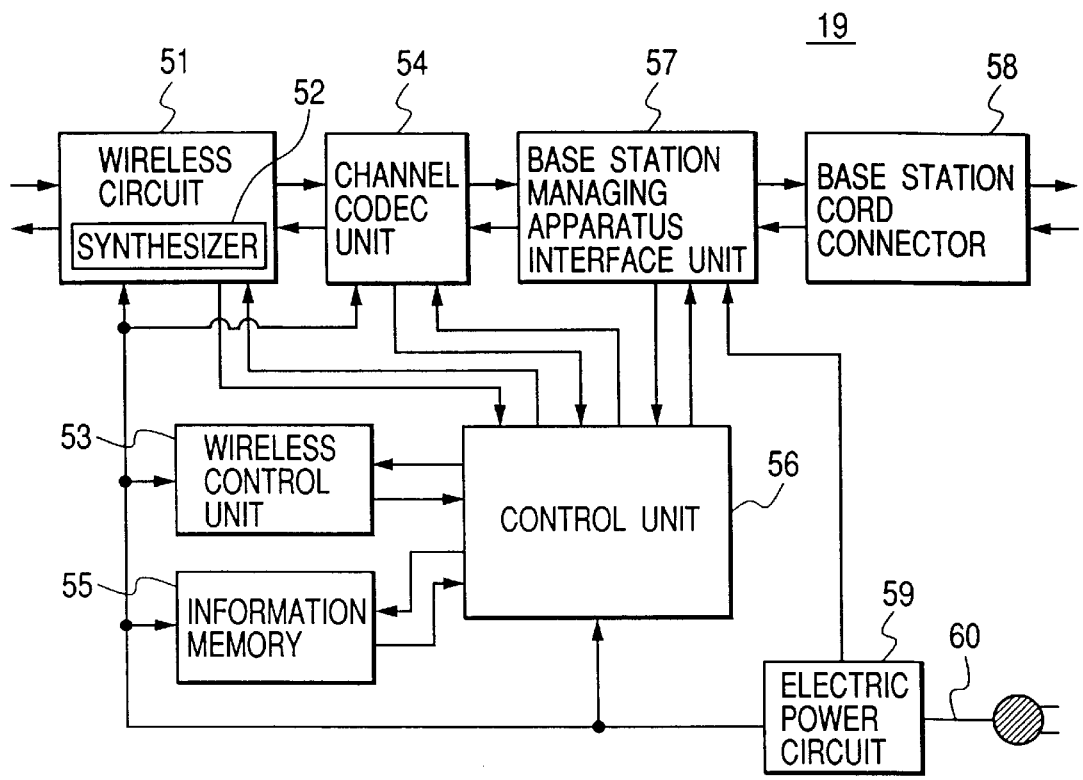
FIG. 3 is a block diagram of a wireless base station shown in FIG. 1.
FIG. 4 shows a format of a burst of informative signal transmitted from the wireless base station shown in FIG. 3.
Figure 5:
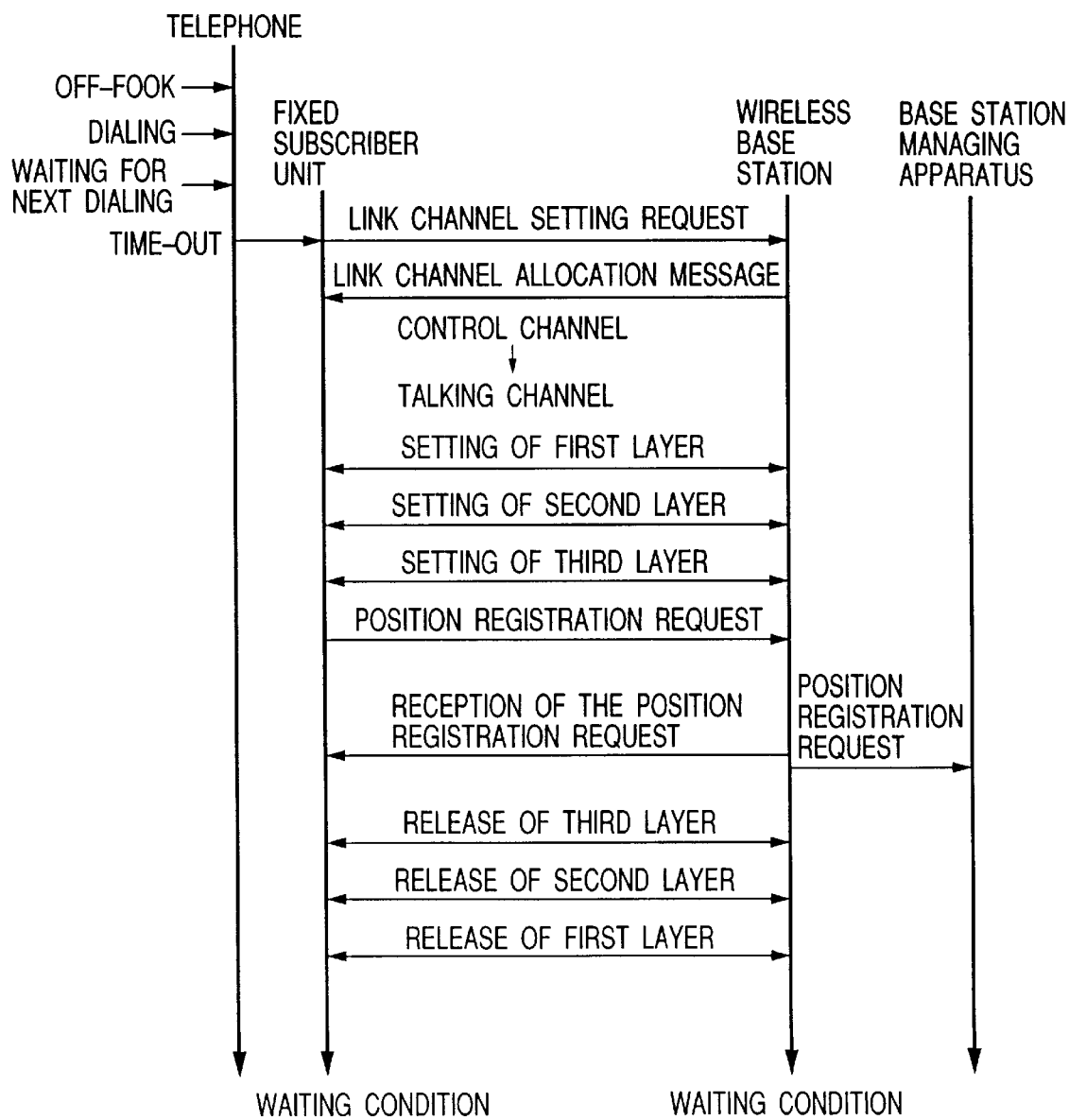
FIG. 5 shows a sequence of position registration prescribed in a PHS standard regulation RCR STD-28.

As shown in FIG. 8, a wireless local loop system 71 comprises the telephone 14, the wire telephone circuit network 24, the fixed subscriber unit 12 shown in FIG. 2, the telephone cord 15, the antenna 16, the antenna line 17, the central telephone exchange 18, the wireless base station 19 shown in FIG. 3, the support 20, the antenna 21, a base station managing apparatus 72 for performing a pseudo-incoming call sequence in which a message of a pseudo-incoming call is transmitted to the fixed subscriber unit 12 to receive a response of an incoming call message from the fixed subscriber unit 12 and a sequence interrupting signal is transmitted to the fixed subscriber unit 12 not to output any incoming call signal to the telephone 14, and the wire cable 23 connecting the wireless base station 19 and the base station managing apparatus 72 of the central telephone exchange 18.

Figure 9:
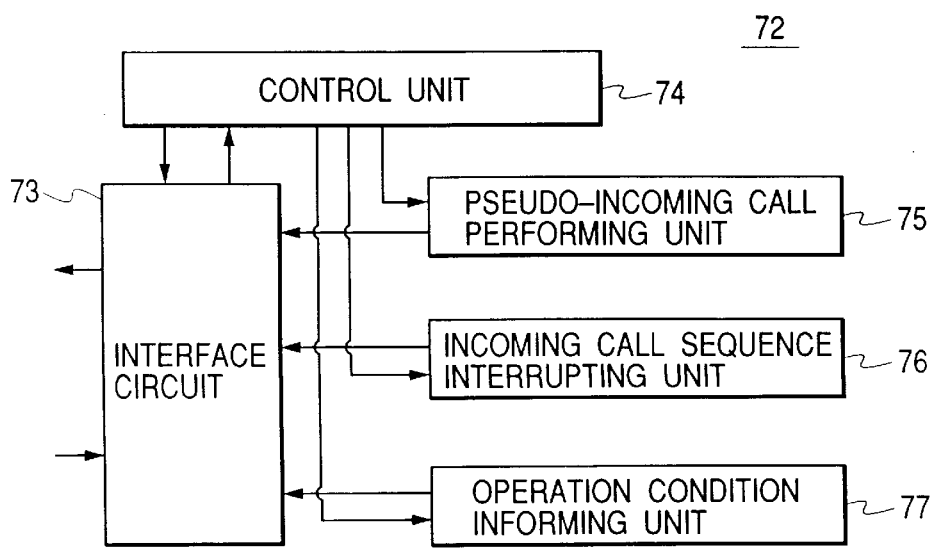
FIG. 9 is a block diagram of a base station managing apparatus shown in FIG. 8.

FIG. 9 is a block diagram of the base station managing apparatus 72.

As shown in FIG. 9, the base station managing apparatus 72 comprises an interface circuit 73 for receiving and transmitting various signals from/to the wire telephone circuit network 24 and the wireless base station 19;

a control unit 74 for controlling the base station managing apparatus 72 in response to the signals received in the interface circuit 73 to perform the pseudo-incoming call sequence;

a pseudo-incoming call performing unit 75 for generating a pseudo-incoming call when a pseudo-incoming call sequence control signal transmitted from the wire telephone circuit network 24 is received in the control unit 74 through the interface circuit 73, transmitting the pseudo-incoming call to the fixed subscriber unit 12 through the interface circuit 73 and the wireless base station 19 to perform the pseudo-incoming call sequence in the fixed subscriber unit 12 and the wireless base station 19 in the same manner as the incoming call sequence described in the prior art and to make the fixed subscriber unit 12 output an incoming call response signal indicating the reception of an incoming call used in the incoming call sequence to the control unit 74, and informing the transmission of the pseudo-incoming call of the control unit 74;

an incoming call sequence interrupting unit 76 for outputting a sequence interrupting signal to the fixed subscriber unit 12 through the wireless base station 19 according to the incoming call response signal received in the control unit 74 to prevent the fixed subscriber unit 12 outputting an incoming call signal to the telephone 14 in the pseudo-incoming call sequence as if the incoming call sequence performed in the fixed subscriber unit 12 and the wireless base station 19 is interrupted not to output any ringer sound from the telephone 14; and an operational condition informing unit 77 for informing the wire telephone circuit network 24 according to the incoming call response signal received in the control unit 74 that the fixed subscriber unit 12 is connected with the wireless base station 19 through an audio communication path and the fixed subscriber unit 12 is normally operated without any malfunction.

In the above configuration of the wireless local loop system 71, a pseudo-incoming call sequence is described with reference to FIG. 10.

Figure 10:
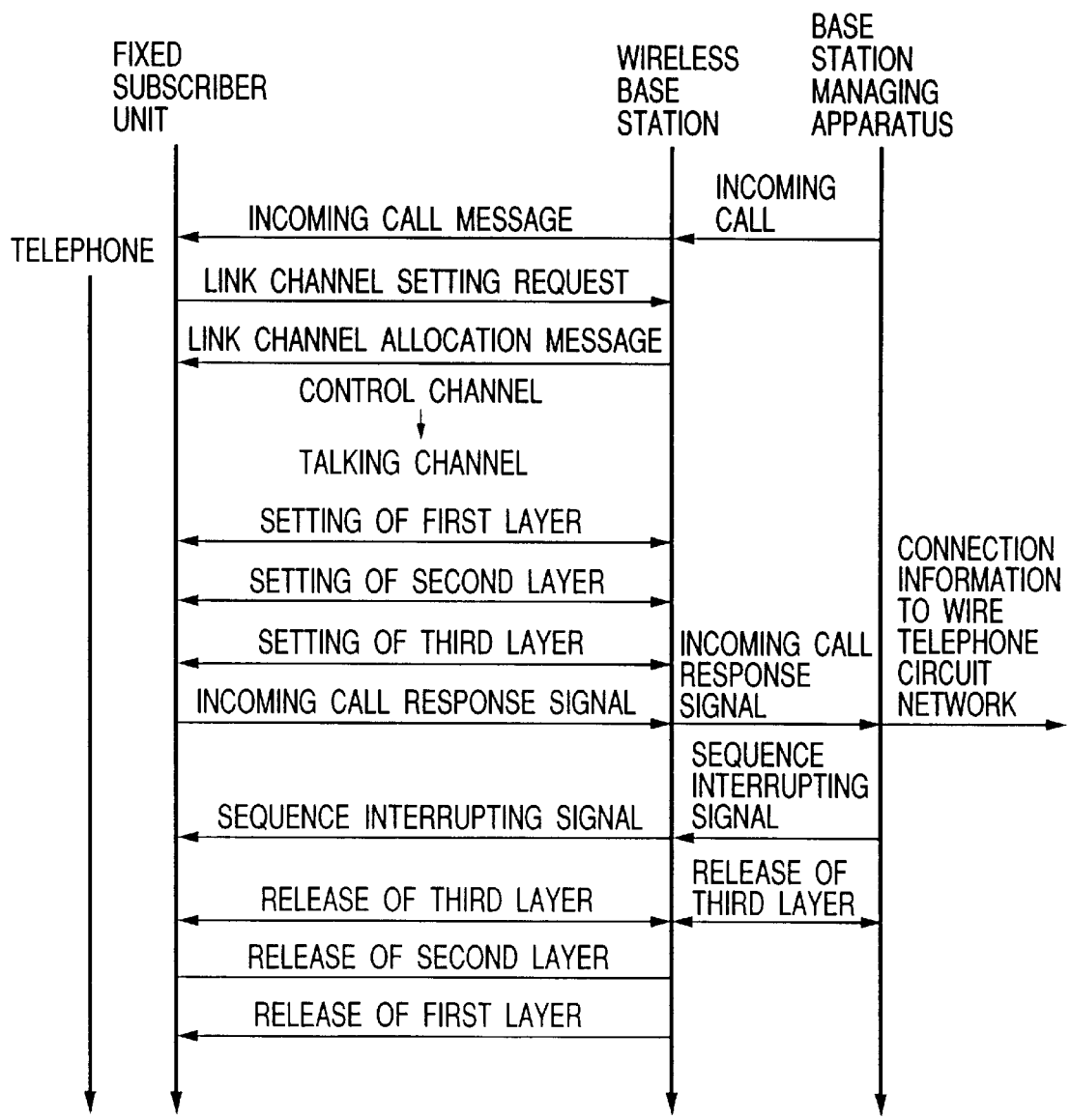
FIG. 10 shows a pseudo-incoming call sequence performed in the wireless local loop system shown in FIG. 8.

FIG. 10 shows a pseudo-incoming call sequence.

To ascertain in a pseudo-incoming call sequence whether or not the fixed subscriber unit 12 of a user is set to an operation condition to wait for an incoming call from a communication partner, when a pseudo-incoming call sequence control signal is transmitted from the wire telephone circuit network 24 to the control unit 74 of the base station managing apparatus 72 through the interface circuit 73, a pseudo-incoming call is generated in the pseudo-incoming call performing unit 75 of the control unit 74 and is transmitted to the wireless base station 19. In the wireless base station 19, the pseudo-incoming call is received as an incoming call urging the execution of the incoming call sequence because the pseudo-incoming call is the same as the incoming call. Therefore, an incoming call message indicating the reception of the incoming call is output as an informative signal from the wireless base station 19 to the fixed subscriber unit 12, and a pseudo-incoming call sequence is performed between the fixed subscriber unit 12 and the wireless base station 19 in the same manner as the incoming call sequence.

In detail, a link channel setting request is transmitted from the fixed subscriber unit 12 to the wireless base station 19 at a control channel under the control of the control unit 37, a link channel allocation message transmitted from the wireless base station 19 is received in the fixed subscriber unit 12, the change from the control channel to a talking channel is performed in the fixed subscriber unit 12 and the wireless base station 19 under the control of the control unit 37, the channel codec unit 35, the control unit 56 and the channel codec unit 54. Thereafter, a sequence at a first layer and a sequence at a second layer are set at the talking channel in that order between the fixed subscriber unit 12 and the wireless base station 19. Thereafter, in the setting of a sequence at a third layer between the fixed subscriber unit 12 and the wireless base station 19, an incoming call response signal indicating the reception of the incoming call message is transmitted from the fixed subscriber unit 12 to the base station managing apparatus 72 through the wireless base station 19 at the talking channel under the control of the control unit 37, the channel codec unit 35, the control unit 56 and the channel codec unit 54 in the same manner as in the incoming call sequence. Therefore, the base station managing apparatus 72 can recognize that the fixed subscriber unit 12 is set to an operation condition to wait for an incoming call from a communication partner.

Thereafter, to prevent the telephone 14 connected with the fixed subscriber unit 12 outputting a ringer sound, when the incoming call response signal is received in the control unit 74 of the base station managing apparatus 72, a sequence interrupting signal is output from the incoming call sequence interrupting unit 76 to the fixed subscriber unit 12 through the wireless base station 19 according to the pseudo-incoming call sequence, in place of the outputting of the ringer sound urging signal. Therefore, the sequence interrupting signal is recognized in the control unit 56 of the wireless base station 19 and the control unit 77 of the fixed subscriber unit 12, and the outputting of an incoming call signal to the telephone 14 is interrupted according to the sequence interrupting signal. Thereafter, a radio communication between the fixed subscriber unit 12 and the wireless base station 19 at the third layer, a radio communication between the fixed subscriber unit 12 and the wireless base station 19 at the second layer and a radio communication between the fixed subscriber unit 12 and the wireless base station 19 at the first layer are cut off, and the fixed subscriber unit 12 and the wireless base station 19 are set to a message receiving condition together.

Therefore, because any incoming call signal is not output to the telephone 14 in the pseudo-incoming call sequence, any ringer sound is not output from the telephone 14, so that the user does not receive any influence of the pseudo-incoming call sequence.

Also, when the incoming call response signal is transmitted to the control unit 74 of the base station managing apparatus 72, the operational condition informing unit 77 informs the wire telephone circuit network 24 that the fixed subscriber unit 12 is connected with the wireless base station 19 through an audio communication path.

Accordingly, a radio communicative connection between the fixed subscriber unit 12 and the wireless base station 19 can be ascertained in a control center managing the wire telephone circuit network 24 without any structural change of the fixed subscriber unit 12 and the wireless base station 19.

In this embodiment, the pseudo-incoming call sequence control signal is transmitted from the wire telephone circuit network 24. However, in cases where the pseudo-incoming call sequence control signal is generated in a pseudo-incoming call generating unit of the base station managing apparatus 72, it is not required that the operational condition informing unit 77 informs the wire telephone circuit network 24 of a radio communicative connection between the fixed subscriber unit 12 and the wireless base station 19, and the base station managing apparatus 72 can ascertain a radio communicative connection between the fixed subscriber unit 12 and the wireless base station 19.

(Second Embodiment)

In this embodiment, a base station managing apparatus recognizes in a modified pseudo-incoming call sequence whether or not an informative signal output from a wireless base station is received in a fixed subscriber unit at an appropriate receive electric field level.

Figure 11:
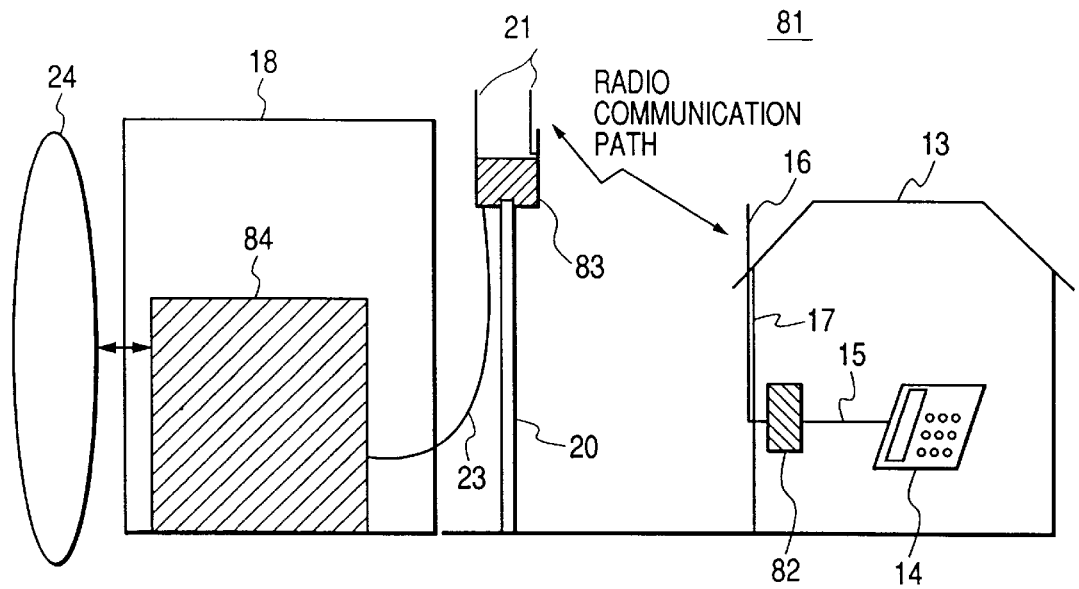
FIG. 11 schematically shows an entire configuration of a wireless local loop system according to a second embodiment of the present invention.

FIG. 11 schematically shows an entire configuration of a wireless local loop system according to a second embodiment of the present invention.

As shown in FIG. 11, a wireless local loop system 81 comprises the telephone 14, the wire telephone circuit network 24, a fixed subscriber unit 82, connected with the telephone 14 through the telephone cord 15 and arranged on a wall of the house 13, for receiving the incoming wireless data transmitted from the wire telephone circuit network 24 through a radio communication path, transferring the incoming wireless data to the telephone 14 through the telephone cord 15, receiving the outgoing wireless data from the telephone 14 through the telephone cord 15 and outputting the outgoing wireless data to the radio communication path, measuring a receive electric field level of an informative signal periodically transmitted through the radio communication path and outputting the receive electric field level of the informative signal to the radio communication path, the antenna 16, the antenna line 17, the central telephone exchange 18, a wireless base station 83, arranged on the support 20 and placed outside the central telephone exchange 18, for receiving the incoming wireless data transmitted from the wire telephone circuit network 24 through the antenna 21, transmitting the incoming wireless data to the fixed subscriber unit 82 through the antenna 21 and the radio communication path, receiving the outgoing wireless data from the fixed subscriber unit 82 through the radio communication path and the antenna 21, transmitting the outgoing wireless data to the wire telephone circuit network 24 through the antenna 21, periodically outputting the informative signal to the radio communication path and receiving the receive electric field level transmitted through the radio communication path, a base station managing apparatus 84 for performing a modified pseudo-incoming call sequence in the same manner as in the pseudo-incoming call sequence and receiving the receive electric field level of the informative signal from the wireless base station 83 to recognize whether or not the informative signal output from the wireless base station 83 is received in the fixed subscriber unit 82 at an appropriate receive electric field level, and the wire cable 23 connecting the wireless base station 83 and the base station managing apparatus 84 of the central telephone exchange 18.

Figure 12:
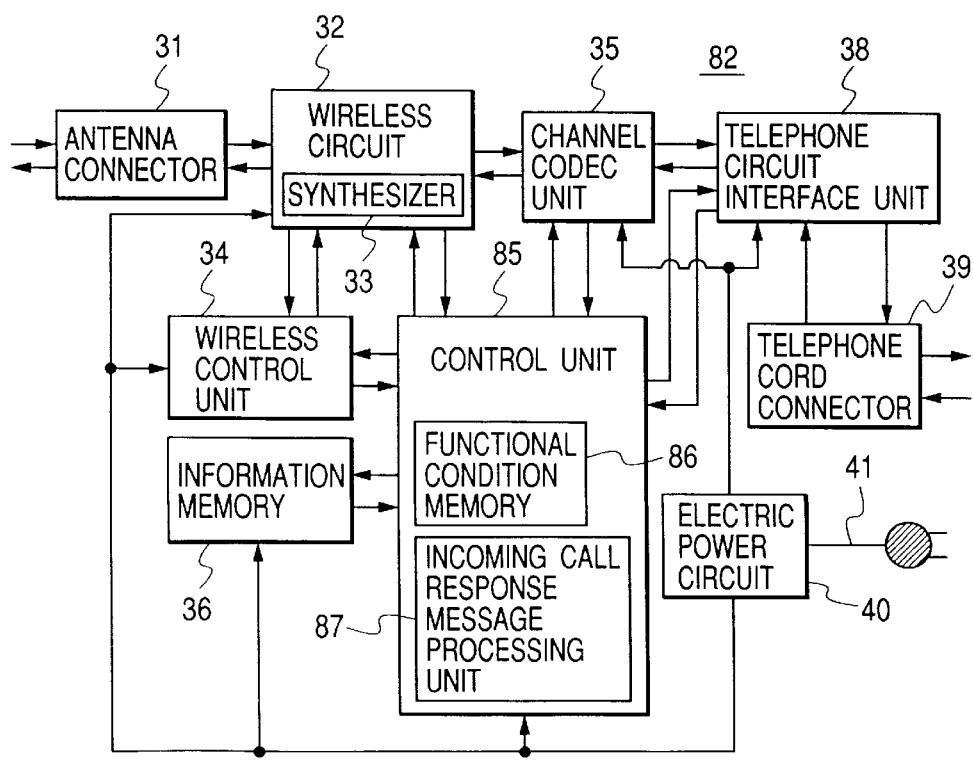
FIG. 12 is a block diagram of a fixed subscriber unit shown in FIG. 11.

FIG. 12 is a block diagram of the fixed subscriber unit 82. As shown in FIG. 12, the fixed subscriber unit 82 comprises:

the antenna connector 31; the wireless circuit 32 having the synthesizer 33; the wireless control unit 34; the channel codec unit 35; the information memory 36;

a control unit 85 having a functional condition memory 86 and an incoming call response message processing unit 87 for controlling the wireless control unit 34, storing the receive electric field level of the informative signal measured by the wireless control unit 34 in the functional condition memory 86 as functional condition information of the fixed subscriber unit 82, adding the functional condition information to an incoming call response message in the incoming call response message processing unit 87, processing the incoming wireless data transmitted at the control channel and transferred from the channel codec unit 35 and producing the outgoing wireless data planned to be transmitted at the control channel;

the telephone circuit interface unit 38; the telephone cord connector 39; the electric power circuit 40; and the electric power cord 41.

Figure 13:
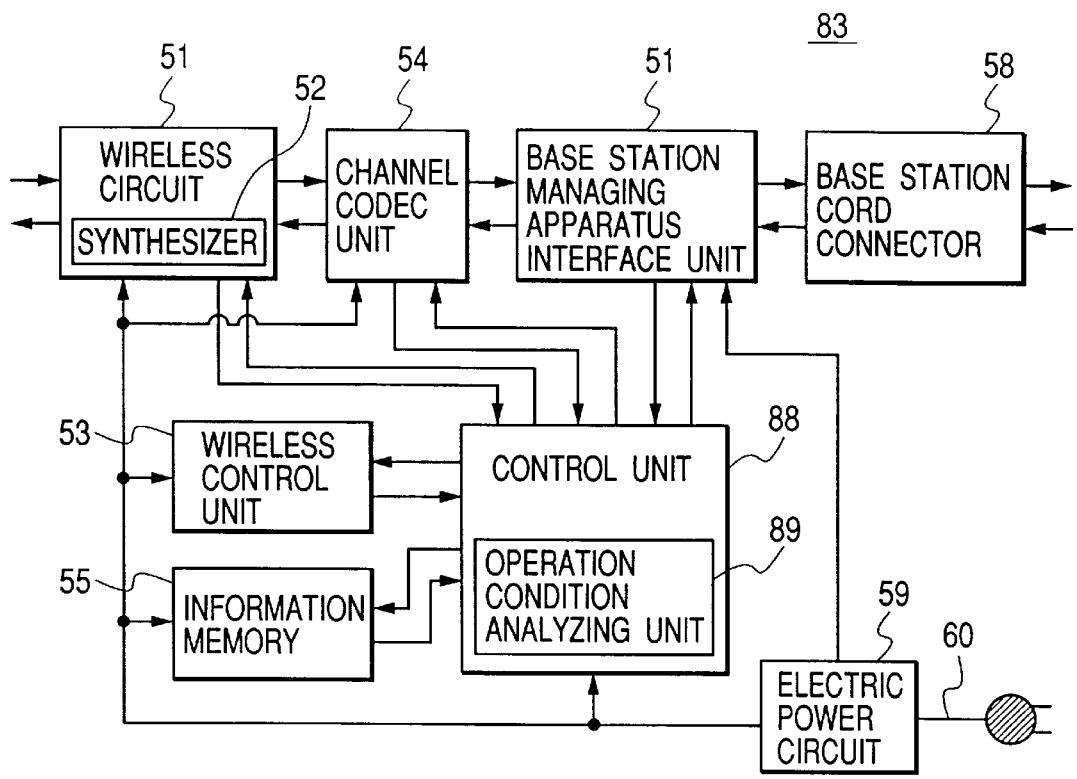
FIG. 13 is a block diagram of a wireless base station shown in FIG. 11.

FIG. 13 is a block diagram of the wireless base station 83. As shown in FIG. 13, the wireless base station 83 comprises:

the wireless circuit 51 having the synthesizer 52; the wireless control unit 53; the channel codec unit 54; the information memory 55;

a control unit 88 having an operational condition analyzing unit 89 and a temporary memory, for controlling the wireless control unit 53, storing the receive electric field level of the outgoing wireless data measured by the wireless control unit 53 in the temporary memory, processing the outgoing wireless data transmitted at the control channel and transferred from the channel codec unit 54, producing the incoming wireless data planned to be transmitted at the control channel, receiving the incoming call response message from the fixed subscriber unit 82 and analyzing the functional condition information of the incoming call response message in the operational condition analyzing unit 89;

the base station managing apparatus interface unit 57; the base station cord connector 58; the electric power circuit 59; and the electric power cord 60.

Figure 14:
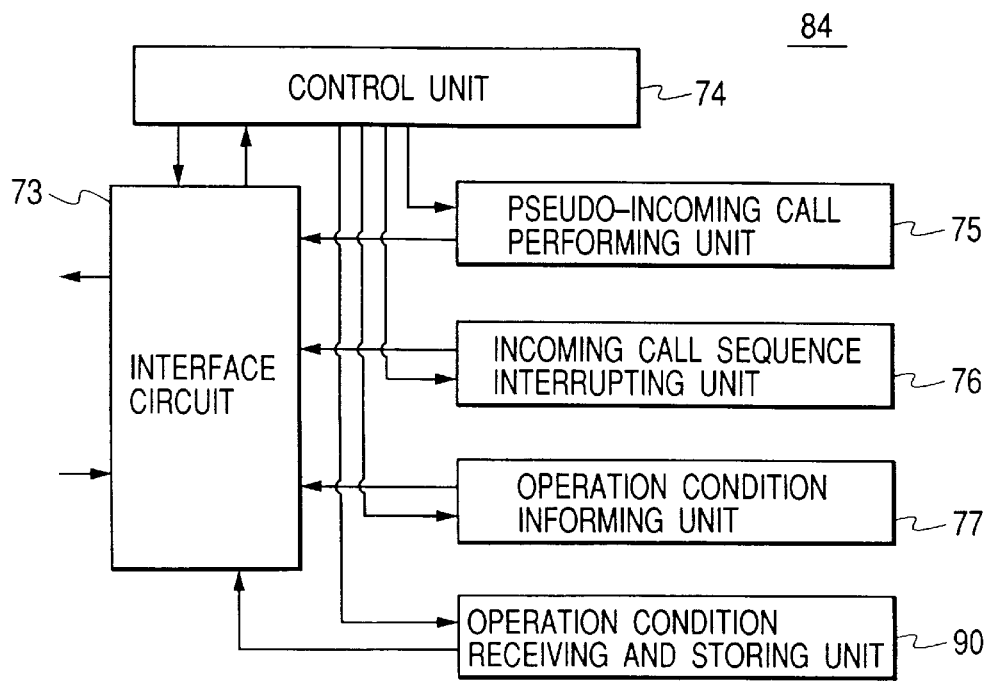
FIG. 14 is a block diagram of a base station managing apparatus shown in FIG. 11.

FIG. 14 is a block diagram of the base station managing apparatus 84.

As shown in FIG. 14, the base station managing apparatus 84 comprises the interface circuit 73, the control unit 74, the pseudo-incoming call performing unit 75, the incoming call sequence interrupting unit 76, the operational condition informing unit 77 and an operation condition receiving and storing unit 90 for receiving the receive electric field level of the informative signal included in the incoming call response message to recognize the operational condition of the fixed subscriber unit 82.

In the above configuration, an operation performed in the wireless local loop system 81 is described with reference to FIG. 15.

The wireless base station 83 periodically transmits an informative signal of a constant frequency at a logical control channel (LCCH) to the fixed subscriber unit 82 through the radio communication path in a communication waiting period, and a receive electric field level of an informative signal is measured in the wireless control unit 34 of the fixed subscriber unit 82 and is stored in the functional condition memory 86 as functional condition information of the fixed subscriber unit 82. That is, when the receive electric field level of the informative signal is high, because a radio communication between the fixed subscriber unit 82 and the wireless base station 83 is excellently performed, the receive electric field level indicates that the fixed subscriber unit 82 is set to a good functional condition.

Figure 15:
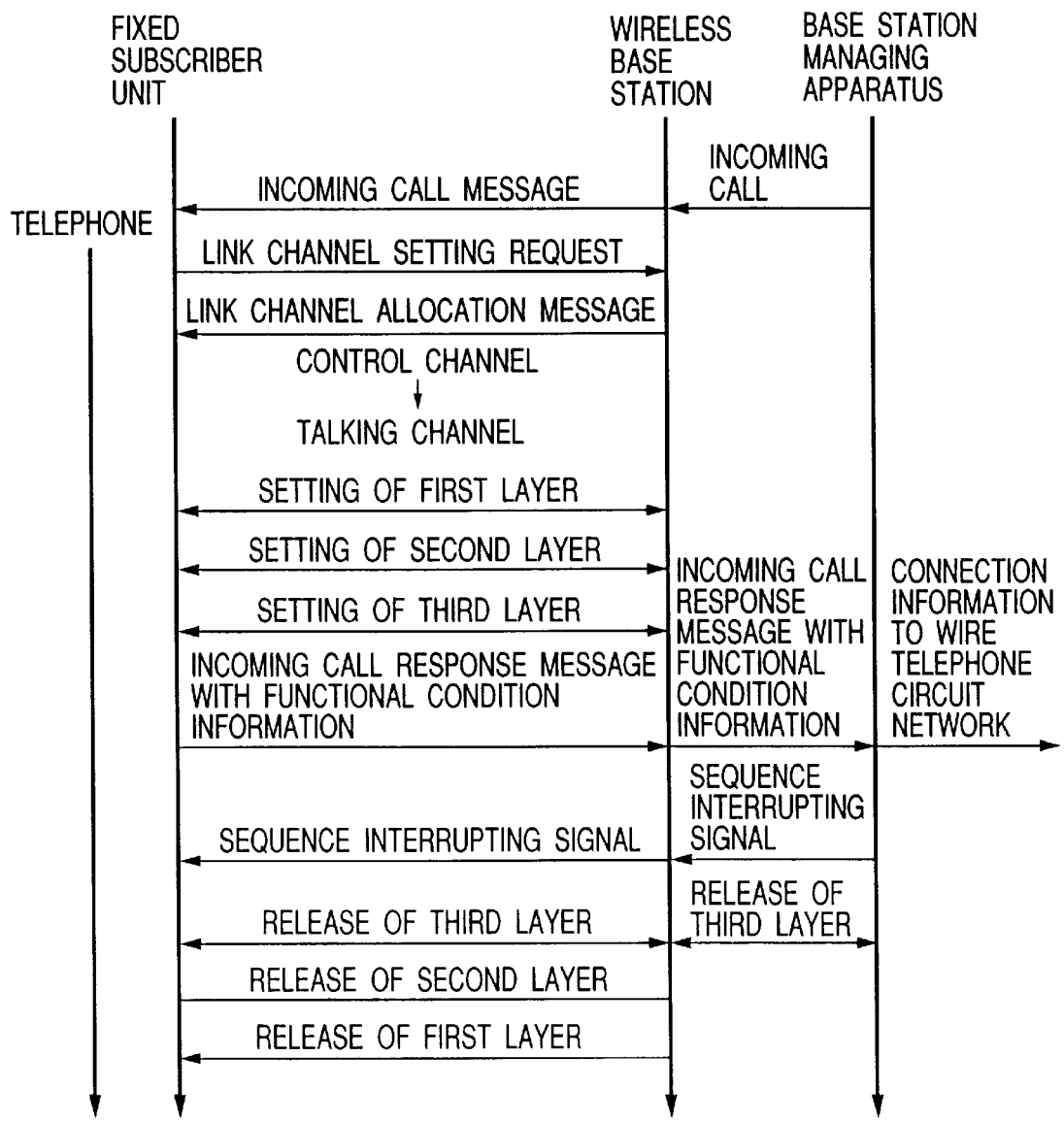
FIG. 15 shows a modified pseudo-incoming call sequence in which the pseudo-incoming call sequence is performed and functional condition information of the fixed subscriber unit is transmitted to the wireless base station according to the second embodiment.

FIG. 15 shows a modified pseudo-incoming call sequence in which the pseudo-incoming call sequence is performed and functional condition information (such as a receive electric field level of an informative signal transmitted from the wireless base station 83) of the fixed subscriber unit 82 is transmitted to the wireless base station 83 according to the second embodiment.

As shown in FIG. 15, when a pseudo-incoming call sequence control signal transmitted from the wire telephone circuit network 24 is received in the control unit 74 of the base station managing apparatus 84, a modified pseudo-incoming call sequence is performed in the same manner as the pseudo-incoming call sequence shown in FIG. 10. When the transmission of an incoming call response message from the fixed subscriber unit 82 to the wireless base station 83 is required in the modified pseudo-incoming call sequence, the functional condition information of the fixed subscriber unit 82 is added to the incoming call response message in the incoming call response message processing unit 87 of the fixed subscriber unit 82, and the incoming call response message with the functional condition information is transmitted from the control unit 85 to the wireless base station 83 through the channel codec unit 35, the wireless circuit 32 and the radio communication path.

When the wireless base station 83 receives the incoming call response message in the control unit 88 through the wireless circuit 51 and the channel codec unit 54, the functional condition information included in the incoming call response message is analyzed in the operational condition analyzing unit 89. Thereafter, the incoming call response message with the functional condition information is transmitted from the control unit 88 to the base station managing apparatus 84 through the base station managing apparatus interface unit 57, and the functional condition information is received in the operation condition receiving and storing unit 90.

Accordingly, a radio communicative connection between the fixed subscriber unit 82 and the wireless base station 83 can be ascertained in the same manner as in the first embodiment, and the base station managing apparatus 84 can recognize whether or not the informative signal output from the wireless base station 83 is received in the fixed subscriber unit 82 at an appropriate receive electric field level.

(Third Embodiment)

In this embodiment, a first wireless base station connected with a fixed subscriber unit is changed to a second wireless base station in cases where a base station managing apparatus recognizes that a traffic density of radio communication lines for the first wireless base station is too high or a quality of a radio communication between the fixed subscriber unit and the first wireless base station is not sufficiently excellent because a receive electric field level of the fixed subscriber unit is too low.

Figure 16:
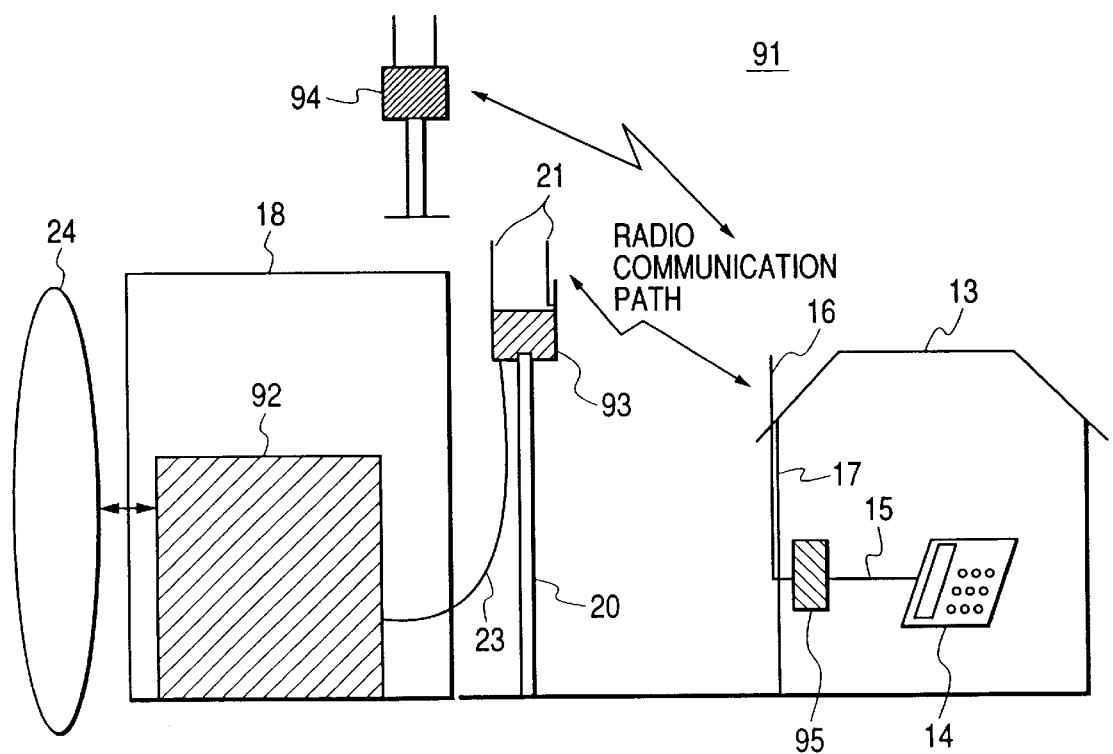
FIG. 16 schematically shows an entire configuration of a wireless local loop system according to a third embodiment of the present invention.

FIG. 16 schematically shows an entire configuration of a wireless local loop system according to a third embodiment of the present invention.

As shown in FIG. 16, a wireless local loop system 91 comprises the telephone 14, the wire telephone circuit network 24, the central telephone exchange 18, a base station managing apparatus 92 connecting the wire telephone circuit network 24 with a plurality of wireless base stations, for performing the modified pseudo-incoming call sequence in the same manner as in the pseudo-incoming call sequence, receiving a receive electric field level of an informative signal transmitted to each fixed subscriber unit to recognize whether or not the informative signal output from one wireless base station is received in the fixed subscriber unit at an appropriate receive electric field level, judging whether or not a traffic density of radio communication lines for each wireless base station is too high or each receive electric field level indicates an excellent quality of a radio communication between one fixed subscriber unit and one wireless base station connected with the fixed subscriber unit, and outputting a base station change instruction indicating the change of a first wireless base station to a second wireless base station in cases where a traffic density of radio communication lines for the first wireless base station is too high or one receive electric field level indicates that a quality of a radio communication between the first wireless base station and a particular fixed subscriber unit connected with the first wireless base station is not sufficiently excellent, the first wireless base station 93, connected with a plurality of fixed subscriber units including the particular fixed subscriber unit through a radio communication path, for receiving the incoming wireless data transmitted from the base station managing apparatus 92 through the antenna 21, transmitting the incoming wireless data to one fixed subscriber unit through the antenna 21 and the radio communication path, receiving the outgoing wireless data from one fixed subscriber unit through the radio communication path and the antenna 21, transmitting the outgoing wireless data to the base station managing apparatus 92 through the antenna 21, periodically outputting the informative signal to each fixed subscriber unit through the radio communication path, receiving the receive electric field level transmitted from each fixed subscriber unit through the radio communication path, receiving the base station change instruction from the base station managing apparatus 92 and outputting a link channel allocation refusing message indicating the refusal of the allocation of a link channel to the particular fixed subscriber unit according to the base station change instruction when a link channel setting request is received from the particular fixed subscriber unit, the second wireless base station 94 connected with a plurality of fixed subscriber units other than the particular fixed subscriber unit through a radio communication path, the wire cable 23 connecting the wireless base stations 93 and 94 and the base station managing apparatus 92 of the central telephone exchange 18, the particular fixed subscriber unit 95, connected with the telephone 14 through the telephone cord 15 and arranged on a wall of the house 13, for receiving the incoming wireless data transmitted from the first wireless base station 93 through the radio communication path, transferring the incoming wireless data to the telephone 14 through the telephone code 15, receiving the outgoing wireless data from the telephone 14 through the telephone cord 15 and outputting the outgoing wireless data to the first wireless base station 93 through the radio communication path, measuring a receive electric field level of an informative signal periodically transmitted from the first wireless base station 93 through the radio communication path, outputting the receive electric field level of the informative signal to the first wireless base station 93 through the radio communication path, receiving the link channel allocation refusing message from the first wireless base station 93 when a link channel setting request is output to the first wireless base station 93, and capturing the second wireless base station 94 on condition that a traffic density of radio communication lines for the second wireless base station 94 is sufficiently low and a quality of a radio communication with the second wireless base station 94 is excellent, the antenna 16 and the antenna line 17.

Figure 17:
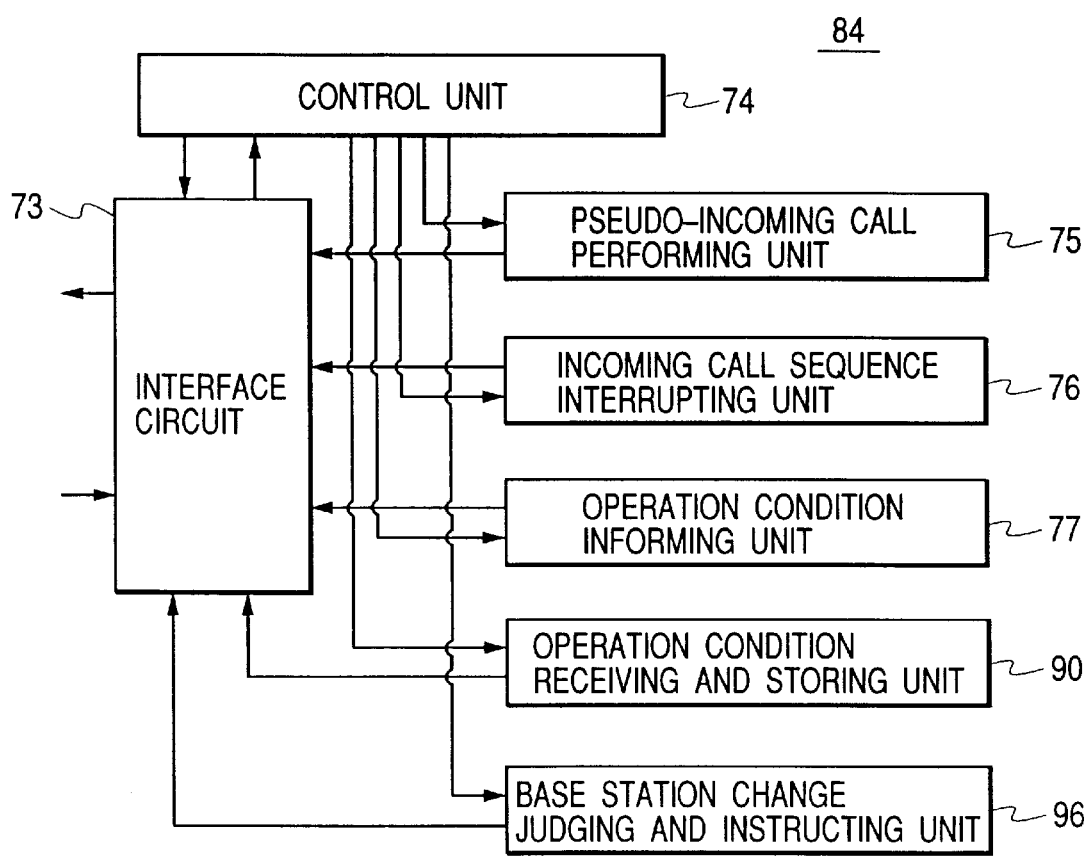
FIG. 17 is a block diagram of a base station managing apparatus shown in FIG. 16.

FIG. 17 is a block diagram of the base station managing apparatus 92.

As shown in FIG. 17, the base station managing apparatus 92 comprises the interface circuit 73, the control unit 74, the pseudo-incoming call performing unit 75, the incoming call sequence interrupting unit 76, the operational condition informing unit 77, the operation condition receiving and storing unit 90, and a base station change judging and instructing unit 96 for judging whether or not a traffic density of radio communication lines for each wireless base station is too high or each receive electric field level received in the operation condition receiving and storing unit 90 indicates an excellent quality of a radio communication between one fixed subscriber unit and one wireless base station connected with the fixed subscriber unit and outputting the base station change instruction to the first wireless base station 93 to instruct the first wireless base station 93 to refuse a radio communicative connection with the particular fixed subscriber unit 95 in cases where a traffic density of radio communication lines for the first wireless base station 93 is too high or one receive electric field level of the particular fixed subscriber unit 95 connected with the first wireless base station 93 is not sufficiently high.

Figure 18:
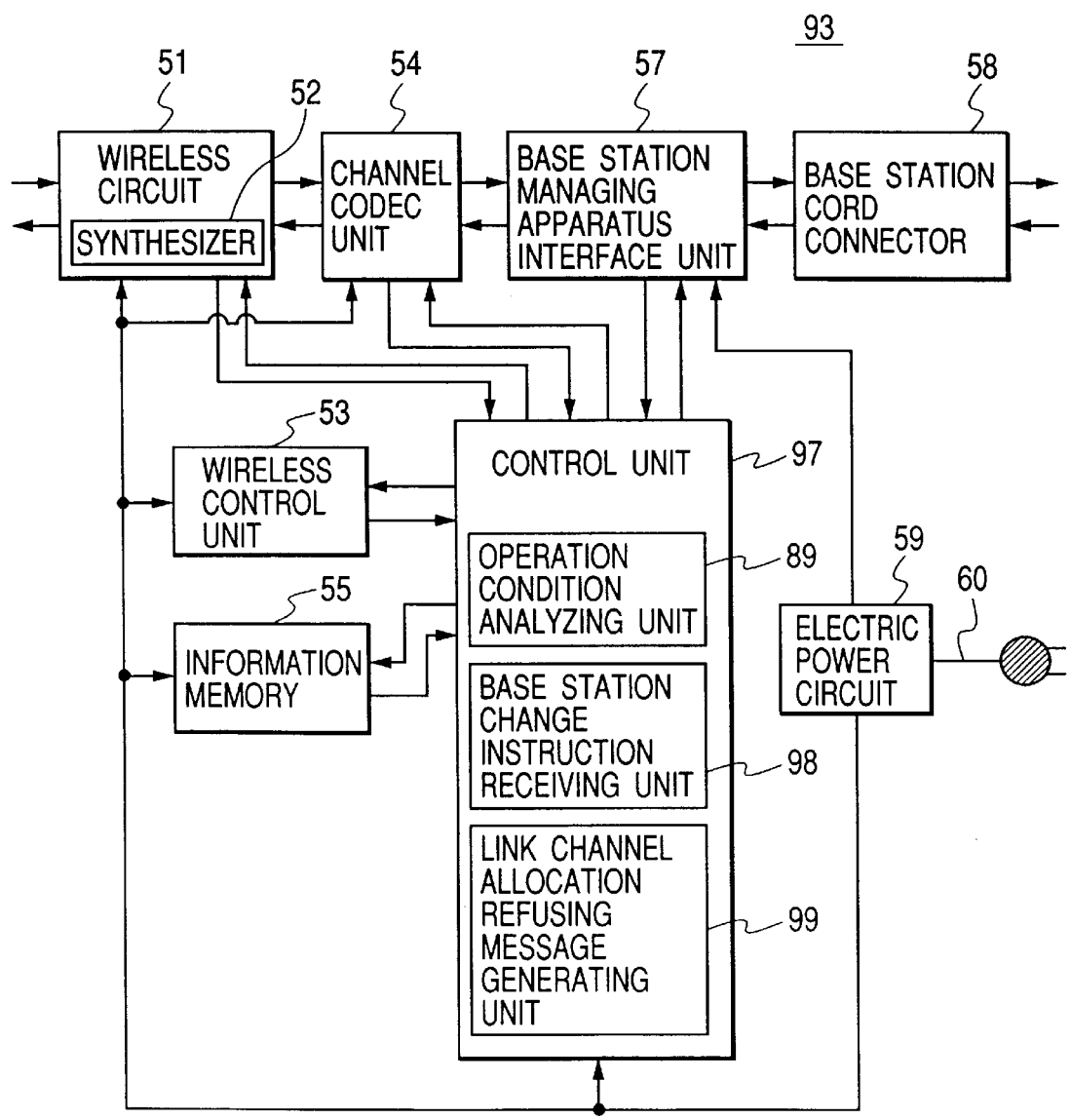
FIG. 18 is a block diagram of a first wireless base station shown in FIG. 16.

FIG. 18 is a block diagram of the first wireless base station 93.

As shown in FIG. 18, the first wireless base station 93 comprises the wireless circuit 51 having the synthesizer 52; the wireless control unit 53; the channel codec unit 54; the information memory 55;

a control unit 97 having a base station change instruction receiving unit 98, a link channel allocation refusing message generating unit 99 and the operational condition analyzing unit 89 for controlling the wireless control unit 53, storing the receive electric field level of the outgoing wireless data measured by the wireless control unit 53 in the temporary memory, processing the outgoing wireless data transmitted at the control channel and transferred from the channel codec unit 54, producing the incoming wireless data planned to be transmitted at the control channel, receiving the incoming call response message from the fixed subscriber unit 82, analyzing the functional condition information of the incoming call response message in the operational condition analyzing unit 89, receiving the base station change instruction transmitted from the base station managing apparatus 92 in the base station change instruction receiving unit 98, generating a link channel allocation refusing message in the link channel allocation refusing message generating unit 99 and outputting the link channel allocation refusing message to the particular fixed subscriber unit 95 according to the base station change instruction not to perform a radio communicative connection with the particular fixed subscriber unit 95 when a link channel setting request is received from the particular fixed subscriber unit 95;

the base station managing apparatus interface unit 57; the base station cord connector 58; the electric power circuit 59; and the electric power cord 60.

Figure 19:
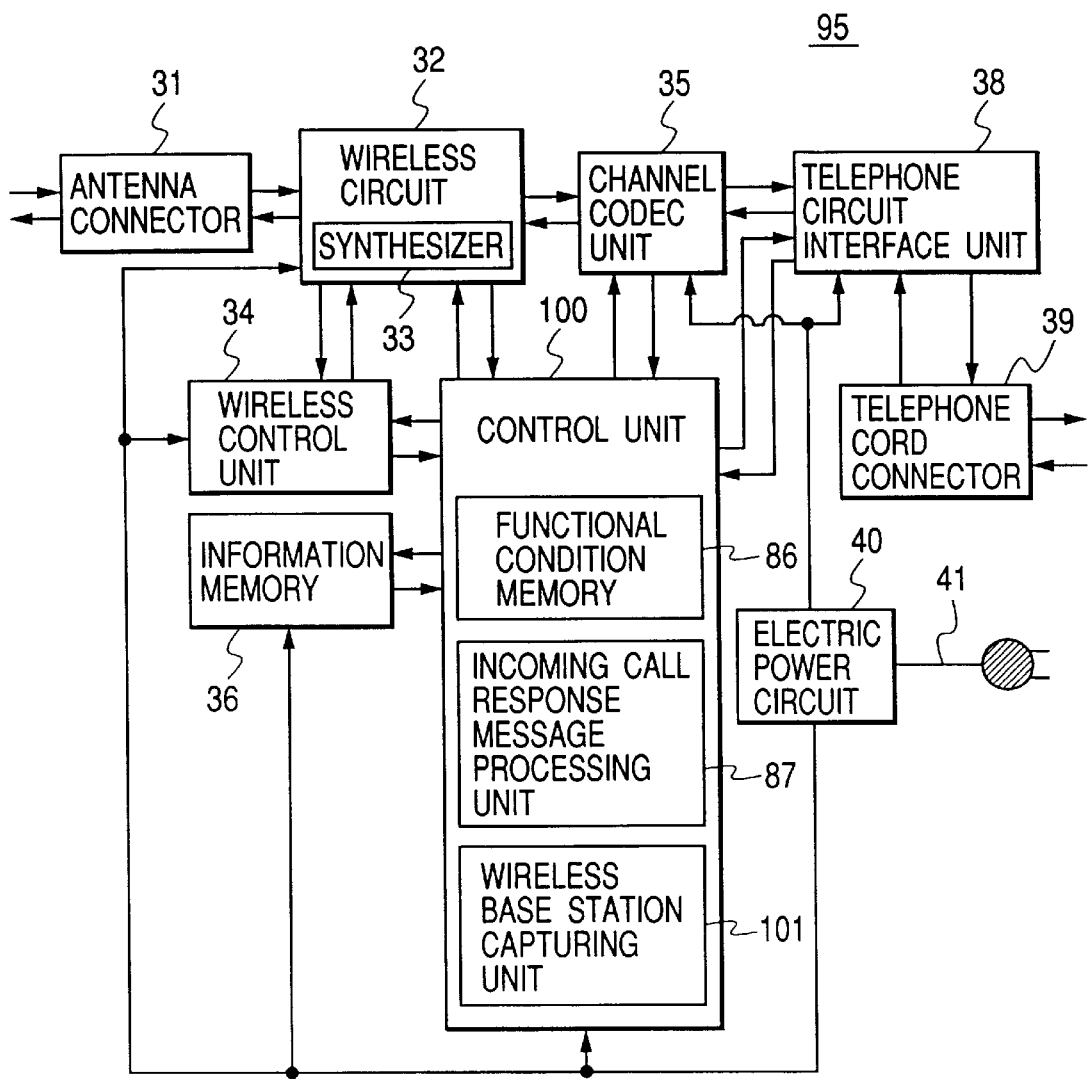
FIG. 19 is a block diagram of the particular fixed subscriber unit shown in FIG. 16.

FIG. 19 is a block diagram of the particular fixed subscriber unit 95. As shown in FIG. 19, the particular fixed subscriber unit 95 comprises the antenna connector 31; the wireless circuit 32 having the synthesizer 33; the wireless control unit 34; the channel codec unit 35; the information memory 36;

a control unit 100 having a wireless base station capturing unit 101, the functional condition memory 86 and the incoming call response message processing unit 87 for controlling the wireless control unit 34, storing the receive electric field level of the informative signal measured by the wireless control unit 34 in the functional condition memory 86 as functional condition information of the fixed subscriber unit 82, adding the functional condition information to an incoming call response message in the incoming call response message processing unit 87, processing the incoming wireless data transmitted at the control channel and transferred from the channel codec unit 35, producing the outgoing wireless data planned to be transmitted at the control channel and capturing the second wireless base station 94 under the control of the wireless base station capturing unit 101 to perform a radio communicative connection with the second wireless base station 94 when the link channel allocation refusing message is received from the first wireless base station 93; the telephone circuit interface unit 38; the telephone cord connector 39; the electric power circuit 40; and the electric power cord 41.

In the above configuration, the base station managing apparatus 92 recognizes a radio communicative connection between the particular fixed subscriber unit 95 and the first wireless base station 93. Also, the judgement whether or not a traffic density of radio communication lines for one wireless base station is too high is periodically performed by the base station change judging and instructing unit 96 of the base station managing apparatus 92 for each wireless base station connected with the base station managing apparatus 92. Also, because the receive electric field level of each fixed subscriber unit is received in the operation condition receiving and storing unit 90 according to the pseudo-incoming call sequence of the second embodiment, the judgement whether or not the receive electric field level of one fixed subscriber unit indicates an excellent quality of a radio communication between the fixed subscriber unit and one wireless base station connected with the fixed subscriber unit is periodically performed by the base station change judging and instructing unit 96 for each fixed subscriber unit. In cases where a traffic density of radio communication lines for the first wireless base station 93 is too high to simultaneously connect a large number of fixed subscriber units including the particular fixed subscriber unit 95 with the first wireless base station 93 and a user of the particular fixed subscriber unit 95 waits for a radio communicative connection with the first wireless base station 93, a base station change instruction indicating the change of the first wireless base station 93 to another wireless base station is output from the base station change judging and instructing unit 96 to the first wireless base station 93. Also, in cases where one receive electric field level of the particular fixed subscriber unit 95 connected with the first wireless base station 93 is not sufficiently high, because it is expected that a quality of a radio communicative connection between the first wireless base station 93 and the particular fixed subscriber unit 95 is degraded, a base station change instruction is output from the base station change judging and instructing unit 96 to the first wireless base station 93.

Figure 20:
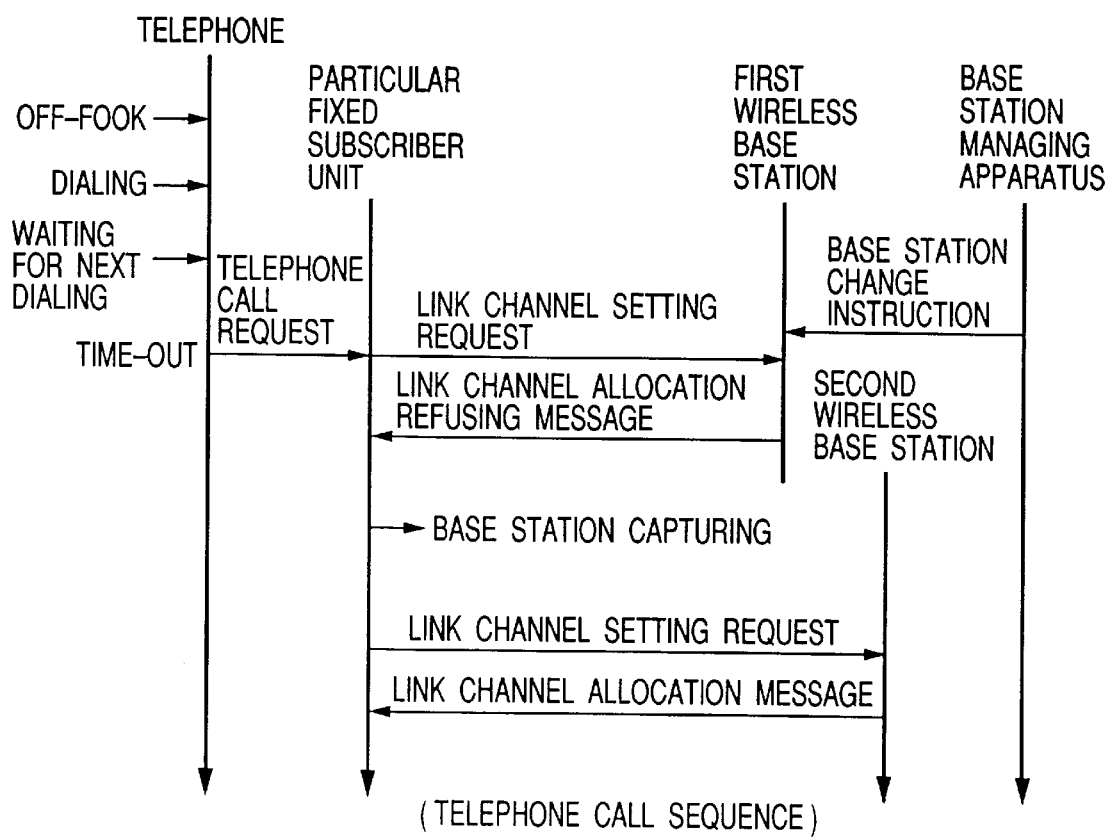
FIG. 20 shows a base station changing sequence shown in FIG. 16.

FIG. 20 shows a base station changing sequence.

As shown in FIG. 20, when a link channel setting request transmitted from the particular fixed subscriber unit 95 is received in the first wireless base station 93 according to a telephone call request of a user, a link channel allocation refusing message indicating the refusal of the allocation of a link channel to the particular fixed subscriber unit 95 is output to the particular fixed subscriber unit 95 according to the base station change instruction.

When the particular fixed subscriber unit 95 receives the link channel allocation refusing message from the particular fixed subscriber unit 95, the particular fixed subscriber unit 95 captures the second wireless base station 94 on condition that a traffic density of radio communication lines for the second wireless base station 94 is sufficiently low and a quality of a radio communication with the second wireless base station 94 is excellent, and a link channel setting request is transmitted from the particular fixed subscriber unit 95 to the second wireless base station 94. Thereafter, when a link channel allocation message is transmitted from the second wireless base station 94 to the particular fixed subscriber unit 95 in response to the link channel setting request, a telephone call sequence is performed between the particular fixed subscriber unit 95 and the second wireless base station 94 in the same manner as in the prior art shown in FIG. 6.

Accordingly, the user of the particular fixed subscriber unit 95 can change the radio communicative connection with the first wireless base station 93 to the radio communicative connection with the second wireless base station 94 by using the receive electric field level of the particular fixed subscriber unit 95, so that a radio communication for the particular fixed subscriber unit 95 can be automatically maintained at an excellent condition even though a functional condition of the first wireless base station 93 connected with the particular fixed subscriber unit 95 is degraded.

(Fourth Embodiment)

In this embodiment, a first wireless base station connected with a fixed subscriber unit is changed to a second wireless base station during a telecommunication conversation between a user of the fixed subscriber unit and a communication partner through the first wireless base station in cases where a base station managing apparatus recognizes that a traffic density of radio communication lines for the first wireless base station is too high or a quality of a radio communication between the fixed subscriber unit and the first wireless base station is not sufficiently excellent because a receive electric field level of the fixed subscriber unit is too low.

Figure 21:
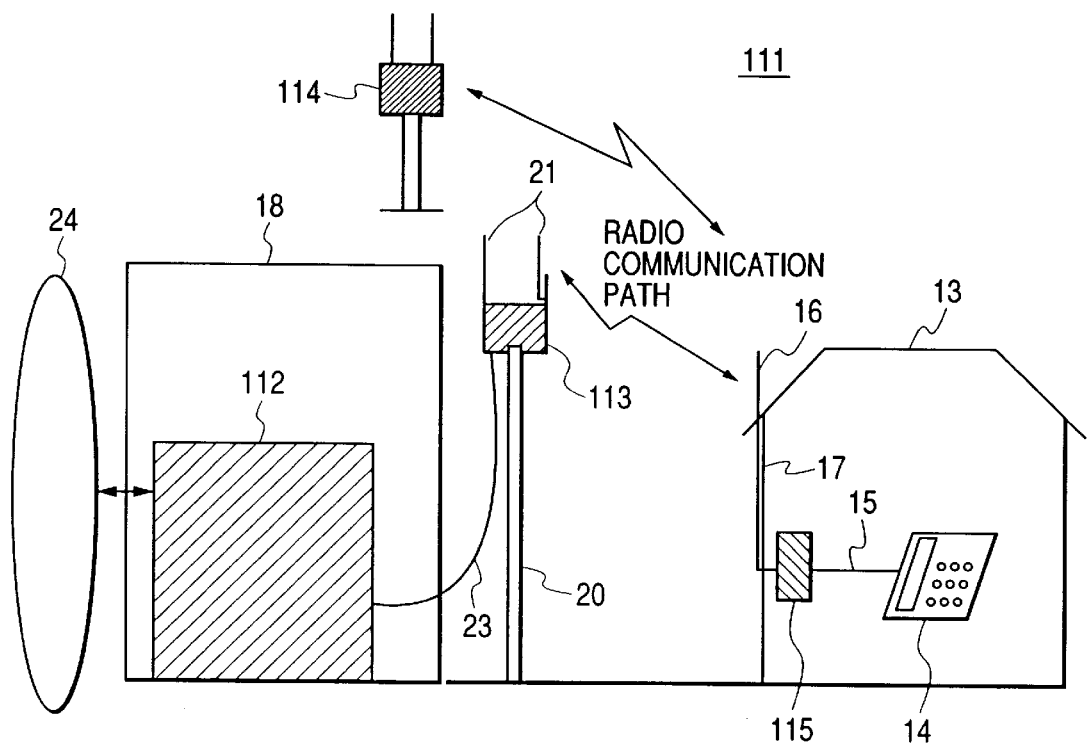
FIG. 21 schematically shows an entire configuration of a wireless local loop system according to a fourth embodiment of the present invention.

FIG. 21 schematically shows an entire configuration of a wireless local loop system according to a fourth embodiment of the present invention.

As shown in FIG. 21, a wireless local loop system 111 comprises the telephone 14, the wire telephone circuit network 24, the central telephone exchange 18, a base station managing apparatus 112 connecting the wire telephone circuit network 24 with a plurality of wireless base stations, for performing the modified pseudo-incoming call sequence in the same manner as in the pseudo-incoming call sequence, receiving a receive electric field level of an informative signal transmitted to each fixed subscriber unit to recognize whether or not the informative signal output from one wireless base station is received in the fixed subscriber unit at an appropriate receive electric field level, judging whether or not a traffic density of radio communication lines for each wireless base station is too high or each receive electric field level indicates an excellent quality of a radio communication between one fixed subscriber unit and one wireless base station connected with the fixed subscriber unit, and outputting a base station change instruction indicating the change of a first wireless base station to a second wireless base station and an identification number of the second wireless base station during a telecommunication conversation between a user of the fixed subscriber unit and a communication partner through the first wireless base station in cases where a traffic density of radio communication lines for the first wireless base station is too high or one receive electric field level indicates that a quality of a radio communication between the first wireless base station and the particular fixed subscriber unit is not sufficiently excellent, the first wireless base station 113, connected with a plurality of fixed subscriber units including the particular fixed subscriber unit through a radio communication path, for receiving the incoming wireless data transmitted from the base station managing apparatus 112 through the antenna 21, transmitting the incoming wireless data to one fixed subscriber unit through the antenna 21 and the radio communication path, receiving the outgoing wireless data from one fixed subscriber unit through the radio communication path and the antenna 21, transmitting the outgoing wireless data to the base station managing apparatus 112 through the antenna 21, periodically outputting the informative signal to each fixed subscriber unit through the radio communication path, receiving the receive electric field level transmitted from each fixed subscriber unit through the radio communication path, receiving the base station change instruction and the identification number of the second wireless base station from the base station managing apparatus 112 during the telecommunication conversation between the user of the fixed subscriber unit and the communication partner through the first wireless base station and outputting a link channel setting instruction indicating the setting of a link channel with a second wireless base station and the identification number of the second wireless base station to the particular fixed subscriber unit during the telecommunication conversation, the second wireless base station 114 connected with a plurality of fixed subscriber units other than the particular fixed subscriber unit through a radio communication path, the wire cable 23 connecting the wireless base stations 113 and 114 and the base station managing apparatus 112 of the central telephone exchange 18, the particular fixed subscriber unit 115, connected with the telephone 14 through the telephone cord 15 and arranged on a wall of the house 13, for receiving the incoming wireless data transmitted from the first wireless base station 113 through the radio communication path, transferring the incoming wireless data to the telephone 14 through the telephone cord 15, receiving the outgoing wireless data from the telephone 14 through the telephone cord 15 and outputting the outgoing wireless data to the first wireless base station 113 through the radio communication path, measuring a receive electric field level of an informative signal periodically transmitted from the first wireless base station 113 through the radio communication path, outputting the receive electric field level of the informative signal to the first wireless base station 113 through the radio communication path, receiving the link channel setting instruction and the identification number of the second wireless base station 114 from the first wireless base station 113 during the telecommunication conversation, receiving an informative signal from the second wireless base station 114 to check a receive electric field level of the informative signal and performing a radio communicative connection with the second wireless base station 114 in cases where the receive electric field level of the informative signal is high, the antenna 16 and the antenna line 17.

Figure 22:
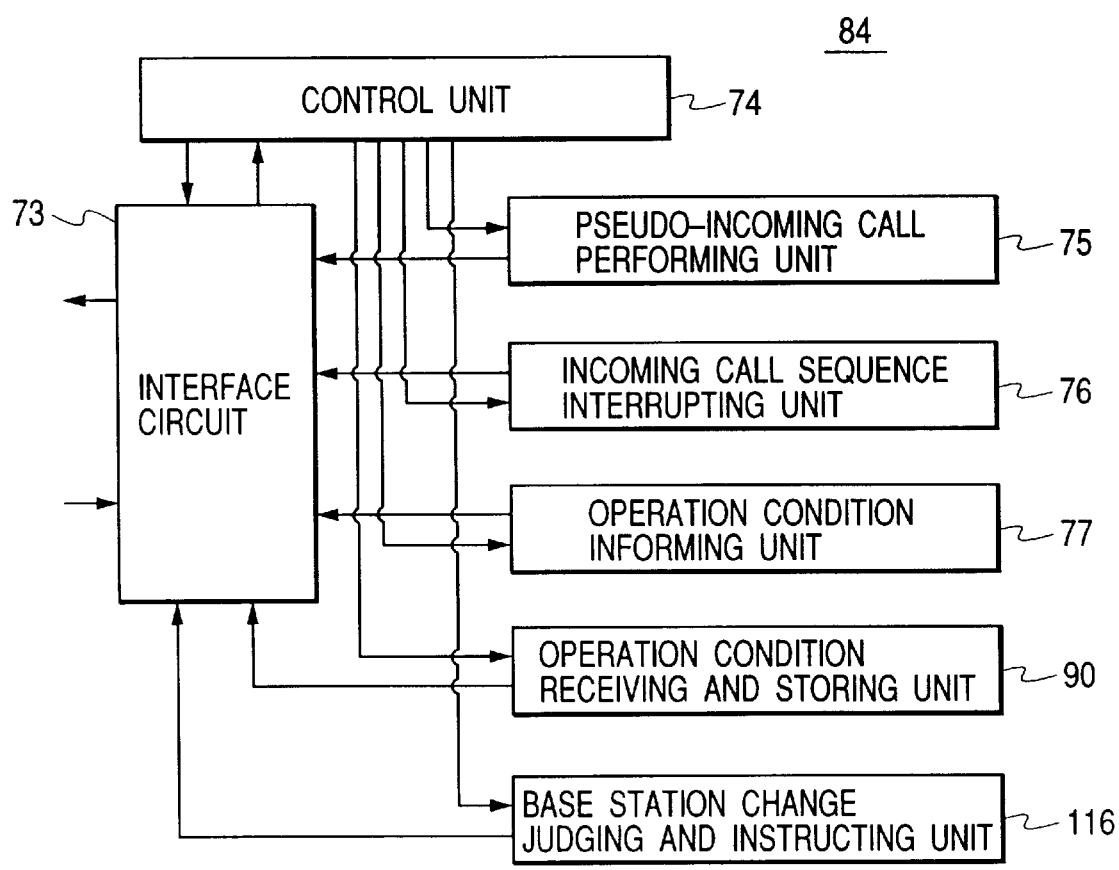
FIG. 22 is a block diagram of a base station managing apparatus shown in FIG. 21.

FIG. 22 is a block diagram of the base station managing apparatus 112.

As shown in FIG. 22, the base station managing apparatus 112 comprises the interface circuit 73, the control unit 74, the pseudo-incoming call performing unit 75, the incoming call sequence interrupting unit 76, the operational condition informing unit 77, the operation condition receiving and storing unit 90, and a base station change judging and instructing unit 116 for judging whether or not a traffic density of radio communication lines for each wireless base station is too high or each receive electric field level received in the operation condition receiving and storing unit 90 indicates an excellent quality of a radio communication between one fixed subscriber unit and one wireless base station connected with the fixed subscriber unit and outputting the base station change instruction and the identification number of the second wireless base station 114 to the first wireless base station 113 to instruct the first wireless base station 113 to disconnect from the particular fixed subscriber unit 115 in cases where a traffic density of radio communication lines for the first wireless base station 113 is too high or one receive electric field level of the particular fixed subscriber unit 115 connected with the first wireless base station 113 is not sufficiently high.

Figure 23:
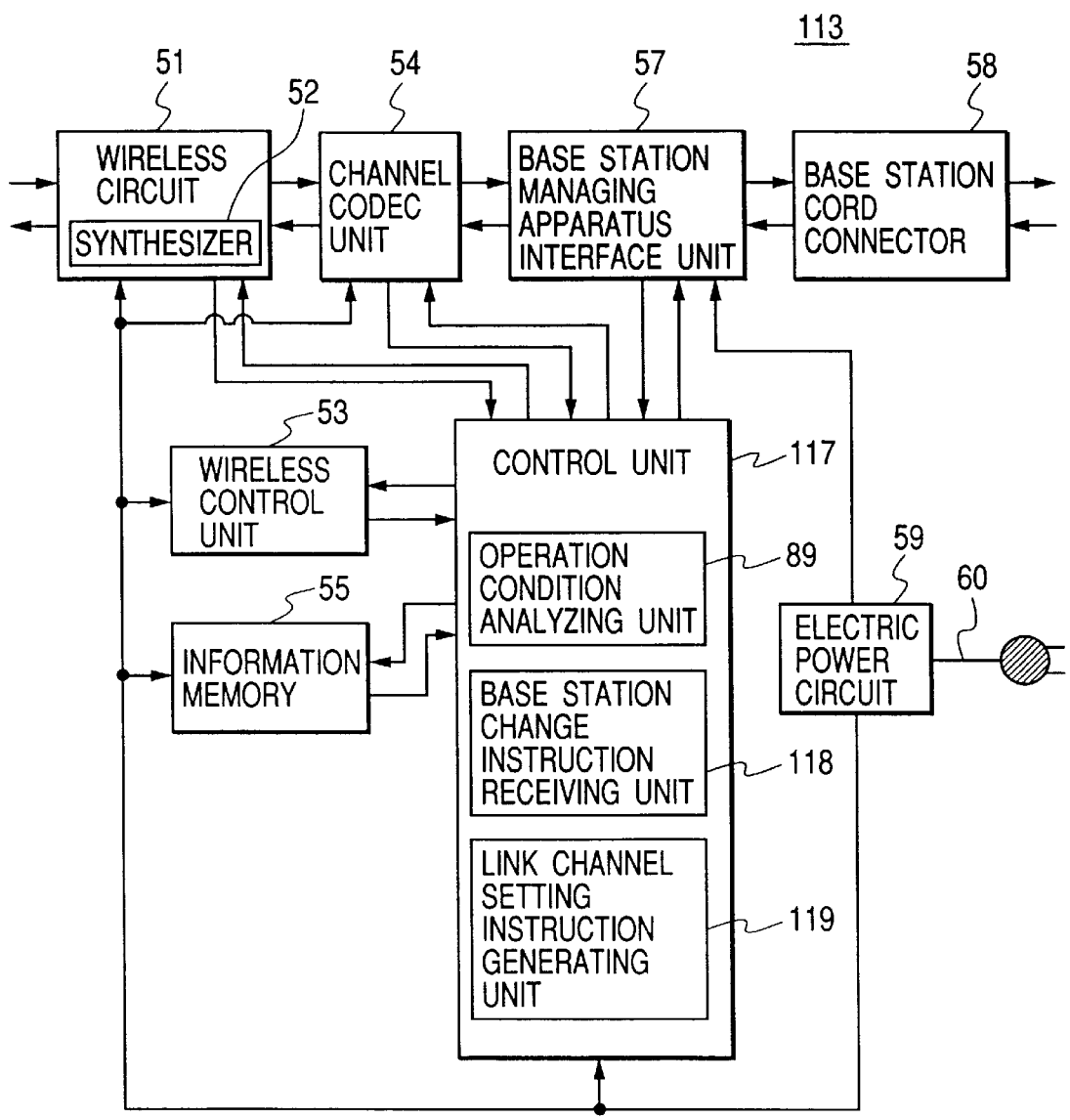
FIG. 23 is a block diagram of a first wireless base station shown in FIG. 21.

FIG. 23 is a block diagram of the first wireless base station 113.

As shown in FIG. 23, the first wireless base station 113 comprises the wireless circuit 51 having the synthesizer 52; the wireless control unit 53; the channel codec unit 54; the information memory 55;

a control unit 117 having a base station change instruction receiving unit 118, a link channel setting instruction generating unit 119 and the operational condition analyzing unit 89 for controlling the wireless control unit 53, storing the receive electric field level of the outgoing wireless data measured by the wireless control unit 53 in the temporary memory, processing the outgoing wireless data transmitted at the control channel and transferred from the channel codec unit 54, producing the incoming wireless data planned to be transmitted at the control channel, receiving the incoming call response message from the fixed subscriber unit 82, analyzing the functional condition information of the incoming call response message in the operational condition analyzing unit 89, receiving the base station change instruction and the identification number of the second wireless base station 114 transmitted from the base station managing apparatus 112 in the base station change instruction receiving unit 118, generating a link channel setting instruction in the link channel setting instruction generating unit 119 and outputting the link channel setting instruction and the identification number of the second wireless base station 114 to the particular fixed subscriber unit 115 according to the base station change instruction to set a radio communicative connection between the particular fixed subscriber unit 115 and the second wireless base station 114;

the base station managing apparatus interface unit 57; the base station cord connector 58; the electric power circuit 59; and the electric power cord 60.

Figure 24:
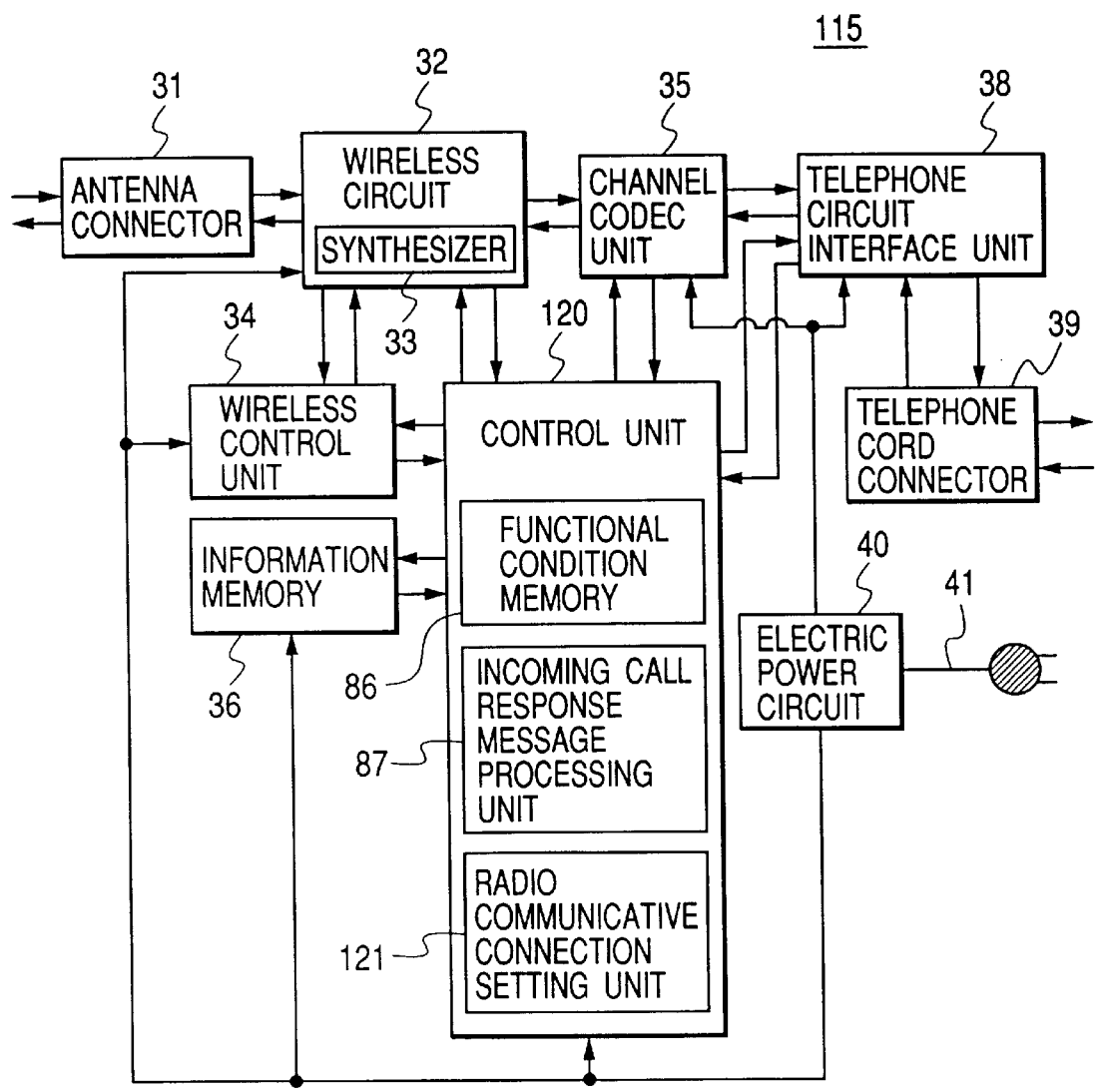
FIG. 24 is a block diagram of a particular fixed subscriber shown in FIG. 21.

FIG. 24 is a block diagram of the particular fixed subscriber unit 115.

As shown in FIG. 24, the particular fixed subscriber unit 115 comprises the antenna connector 31; the wireless circuit 32 having the synthesizer 33; the wireless control unit 34; the channel codec unit 35; the information memory 36;

a control unit 120 having a radio communicative connection setting unit 121, the functional condition memory 86 and the incoming call response message processing unit 87 for controlling the wireless control unit 34, storing the receive electric field level of the informative signal measured by the wireless control unit 34 in the functional condition memory 86 as functional condition information of the fixed subscriber unit 82, adding the functional condition information to an incoming call response message in the incoming call response message processing unit 87, processing the incoming wireless data transmitted at the control channel and transferred from the channel codec unit 35, producing the outgoing wireless data planned to be transmitted at the control channel, receiving an informative signal from the second wireless base station 114 under the control of the radio communicative connection setting unit 121 to check a receive electric field level of the informative signal in the wireless control unit 34 when the link channel setting instruction and the identification number of the second wireless base station 114 are received from the first wireless base station 113 and setting a radio communicative connection with the second wireless base station 114 under the control of the radio communicative connection setting unit 121 in cases where the receive electric field level of the informative signal is high;

the telephone circuit interface unit 38; the telephone cord connector 39; the electric power circuit 40; and the electric power cord 41.

In the above configuration, a base station changing operation performed in the wireless local loop system 111 is described with reference to FIG. 25.

Figure 25:
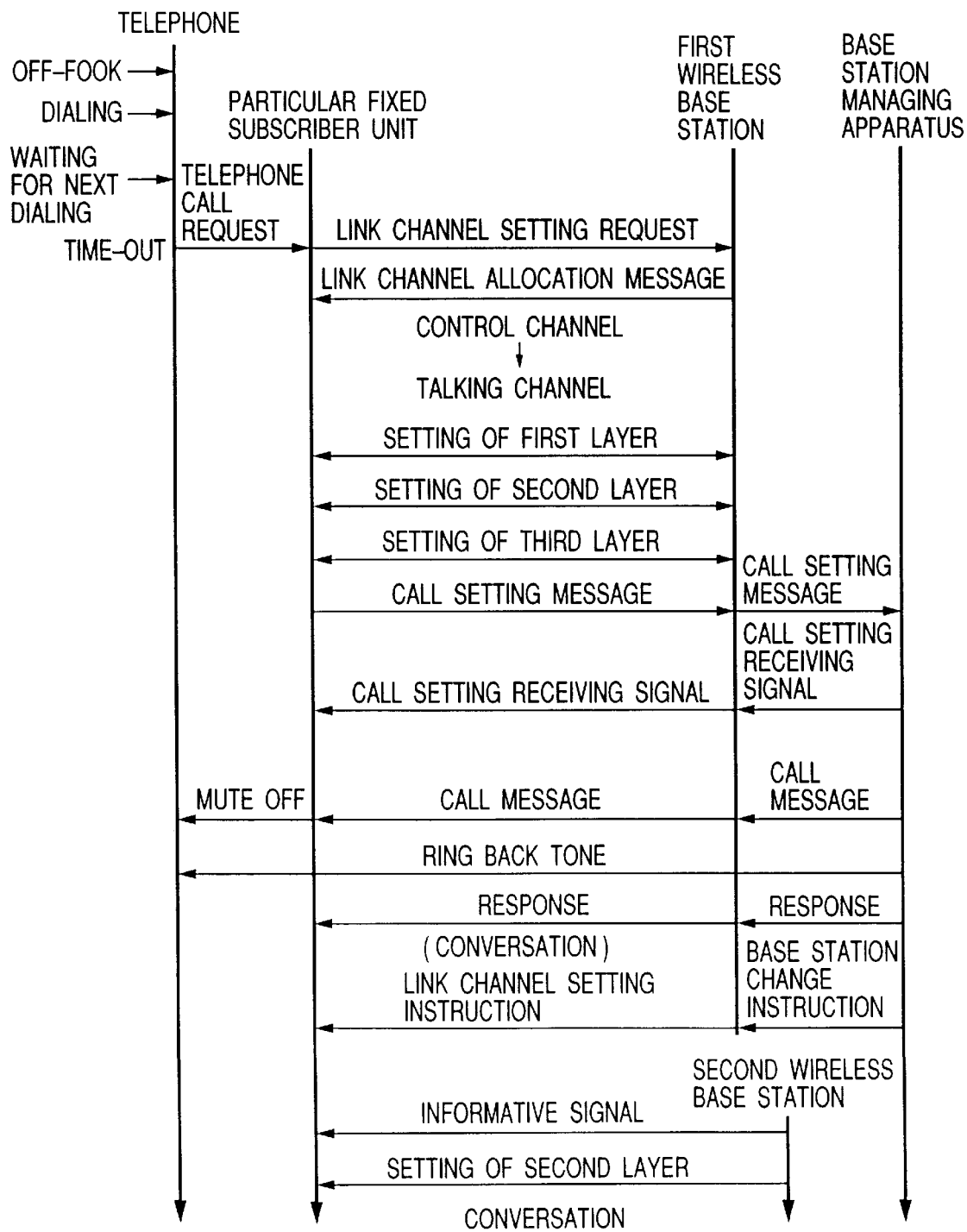
FIG. 25 shows a base station changing sequence performed according to the fourth embodiment.

FIG. 25 shows a base station changing sequence performed according to the fourth embodiment.

Figure 6:
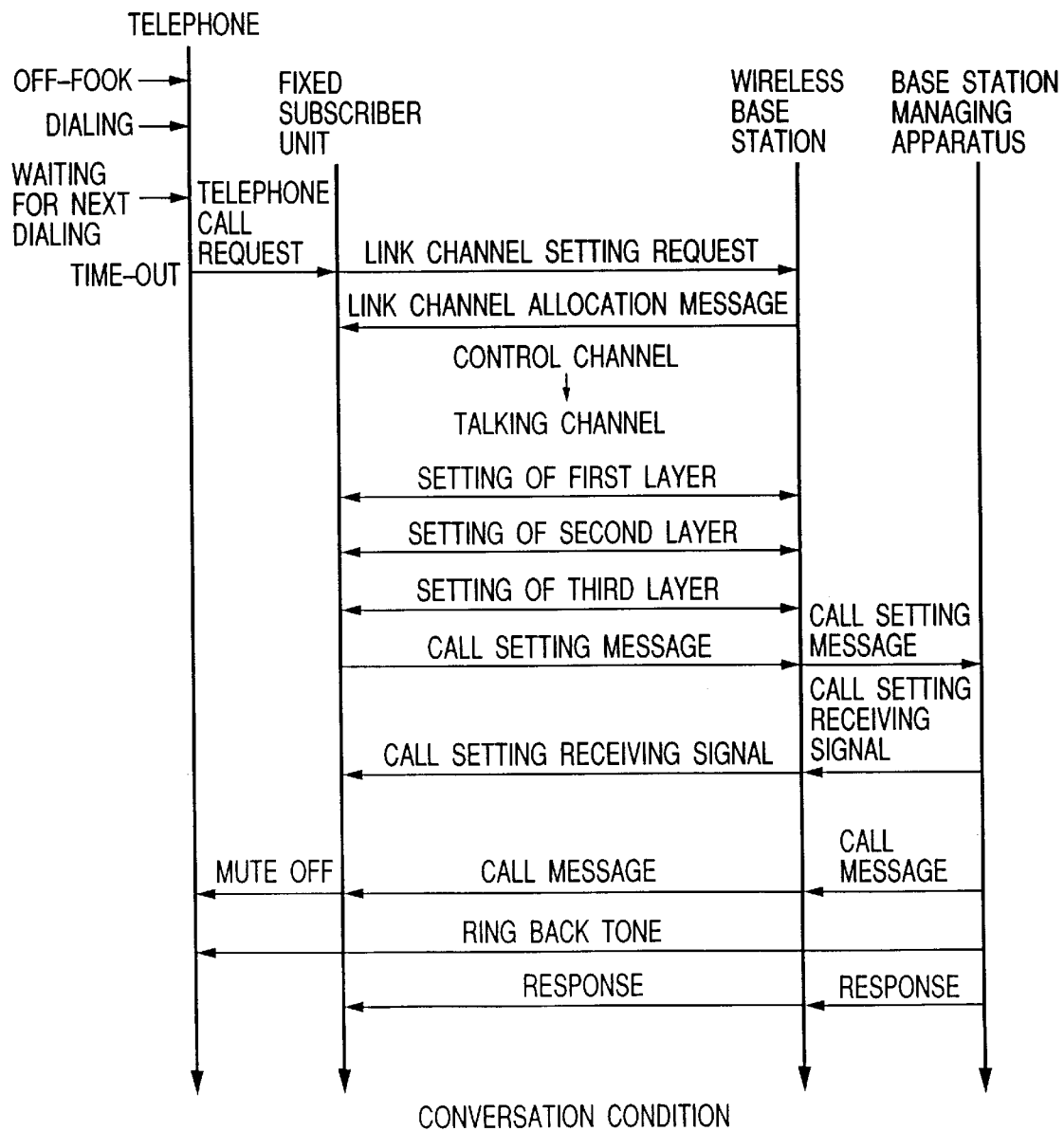
FIG. 6 shows a sequence of a telephone call prescribed in the RCR STD-28.

As shown in FIG. 25, a telephone call sequence is performed in the same manner as that in the prior art shown in FIG. 6, and a telecommunication conversation is performed between a user of the particular fixed subscriber unit 115 and a communication partner through the first wireless base station 113. Thereafter, when the base station change judging and instructing unit 116 of the base station managing apparatus 112 recognizes that a traffic density of radio communication lines for the first wireless base station 113 is too high or a receive electric field level of the particular fixed subscriber unit 115 is not sufficiently high, the base station managing apparatus 112 desires to disconnect the particular fixed subscriber unit 115 from the first wireless base station 113 and to connect the particular fixed subscriber unit 115 with the second wireless base station 114, so that a base station change instruction and an identification number of the second wireless base station 114 are output from the base station change judging and instructing unit 116 to the base station change instruction receiving unit 118 of the control unit 117 of the first wireless base station 113 through the base station managing apparatus interface unit 57. Thereafter, the base station change instruction and the identification number of the second wireless base station 114 are analyzed in the control unit 117, a link channel setting instruction is generated in the link channel setting instruction generating unit 119, and the link channel setting instruction and the identification number of the second wireless base station 114 are output to the particular fixed subscriber unit 115 to urge the particular fixed subscriber unit 115 to set a radio communicative connection with the second wireless base station 114. When the particular fixed subscriber unit 115 receives the link channel setting instruction and the identification number of the second wireless base station 114 transmitted through the channel codec unit 54 and the wireless circuit 51, the link channel setting instruction and the identification number of the second wireless base station 114 are analyzed in the control unit 120, an informative signal is received from the second wireless base station 114 under the control of the radio communicative connection setting unit 121 to check a receive electric field level of the informative signal in the wireless control unit 34, a radio communicative connection with the second wireless base station 114 is set under the control of the radio communicative connection setting unit 121 in cases where the receive electric field level of the informative signal is high, and a radio communicative connection with the first wireless base station 113 is disconnected. Therefore, the user of the particular fixed subscriber unit 115 continues the telecommunication conversation with the communication partner through the second wireless base station 114.

Accordingly, when the base station managing apparatus 112 recognizes that the change of the first wireless base station 113 connected with the particular fixed subscriber unit 115 to the second wireless base station 114 is required, even though the base station managing apparatus 112 recognizes during the telecommunication conversation between the user of the particular fixed subscriber unit 115 and a communication partner, the first wireless base station 113 connected with the particular fixed subscriber unit 115 of the user can be automatically changed to the second wireless base station 114 on condition that a functional condition of the particular fixed subscriber unit 115 for the second wireless base station 114 is excellent.

Figure 7:
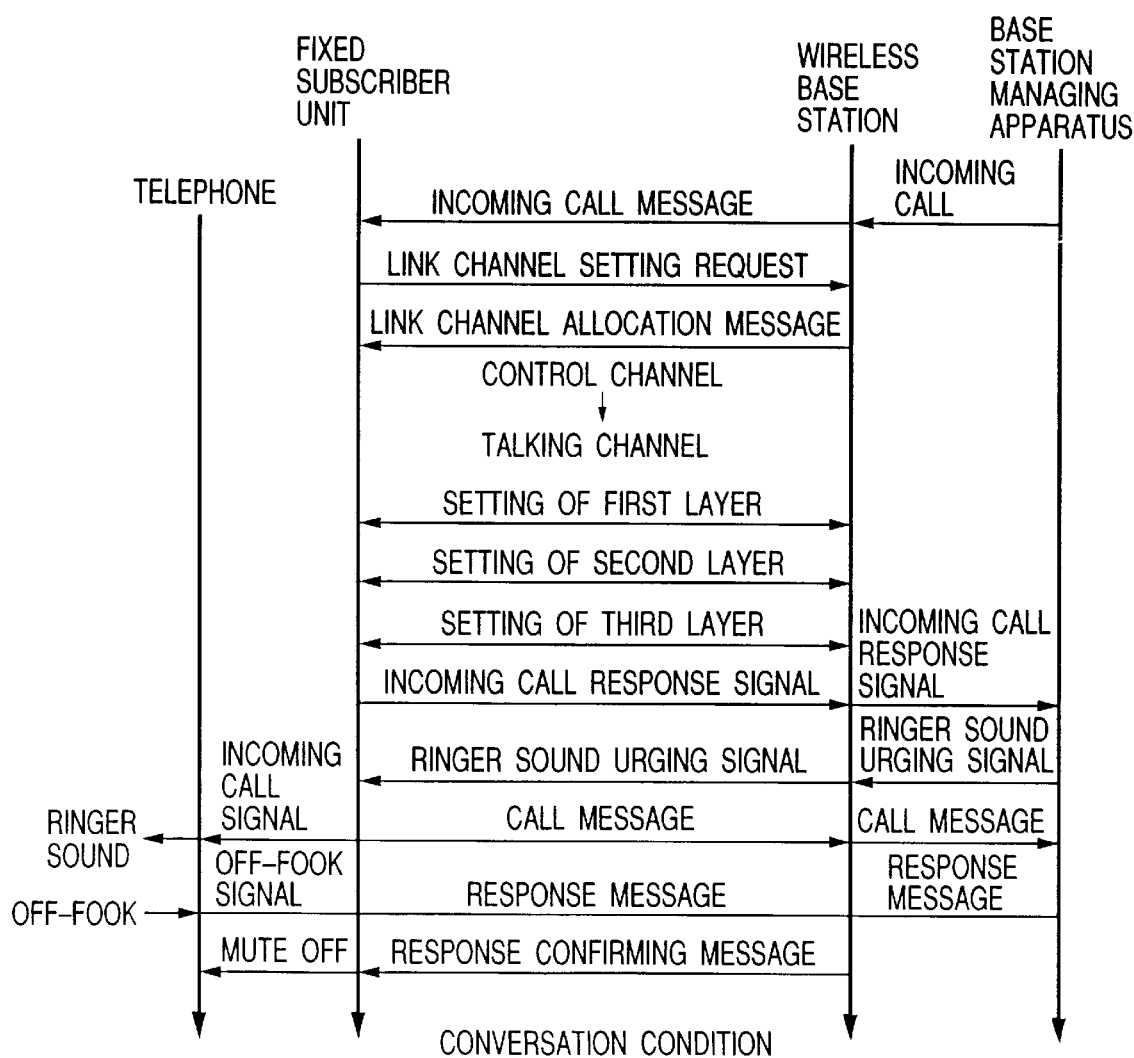
FIG. 7 shows a sequence of an incoming call prescribed in the RCR STD-28.

In this embodiment, the telecommunication conversation is performed after the telephone call sequence is performed in the same manner as that in the prior art shown in FIG. 6. However it is applicable that the telecommunication conversation be performed after the incoming call sequence is performed in the same manner as that in the prior art shown in FIG. 7.

(Fifth Embodiment)

In this embodiment, the transmission timing for the outgoing wireless data transmitted from a fixed subscriber unit to a wireless base station is adjusted under the control of a base station managing apparatus.

Figure 26:
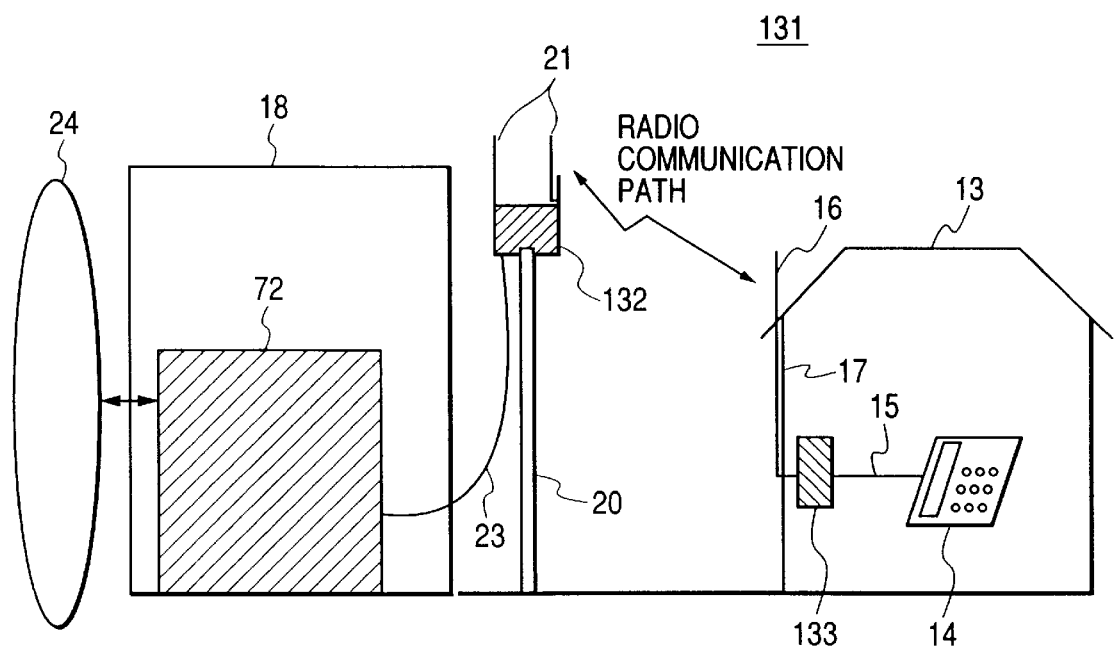
FIG. 26 schematically shows an entire configuration of a wireless local loop system according to a fifth embodiment of the present invention.

FIG. 26 schematically shows an entire configuration of a wireless local loop system according to a fifth embodiment of the present invention.

As shown in FIG. 26, a wireless local loop system 131 comprises the telephone 14, the wire telephone circuit network 24, the telephone cord 15, the antenna 16, the antenna line 17, the central telephone exchange 18, the support 20, the antenna 21, the base station managing apparatus 72, a wireless base station 132, connected with a plurality of fixed subscriber units through a radio communication path, for receiving incoming wireless data transmitted from the base station managing apparatus 72 through the antenna 21, outputting the incoming wireless data through the antenna 21 and the radio communication path, receiving outgoing wireless data through the radio communication path and the antenna 21, transmitting the outgoing wireless data to the base station managing apparatus 72 through the antenna 21, periodically outputting the informative signal through the radio communication path, receiving the sequence interrupting signal from the base station managing apparatus 72, adding transmission timing adjusting information indicating the adjustment of a transmission timing for the outgoing wireless data transmitted from a fixed subscriber unit to the sequence interrupting signal and outputting the sequence interrupting signal with the transmission timing adjusting information through the radio communication path, the wire cable 23 connecting the wireless base station 132 and the base station managing apparatus 72 of the central telephone exchange 18, and a fixed subscriber unit 133, included in the fixed subscriber units, for receiving the incoming wireless data transmitted from the wireless base station 132 through the radio communication path, transferring the incoming wireless data to the telephone 14 through the telephone cord 15, receiving the outgoing wireless data from the telephone 14 through the telephone cord 15, outputting the outgoing wireless data to the wireless base station 132 through the radio communication path at a transmission timing, analyzing the informative signal periodically transmitted from the first wireless base station 113 through the radio communication path, receiving the sequence interrupting signal with the transmission timing adjusting information from the wireless base station 132 and adjusting the transmission timing for the outgoing wireless data according to the transmission timing adjusting information.

Figure 27:
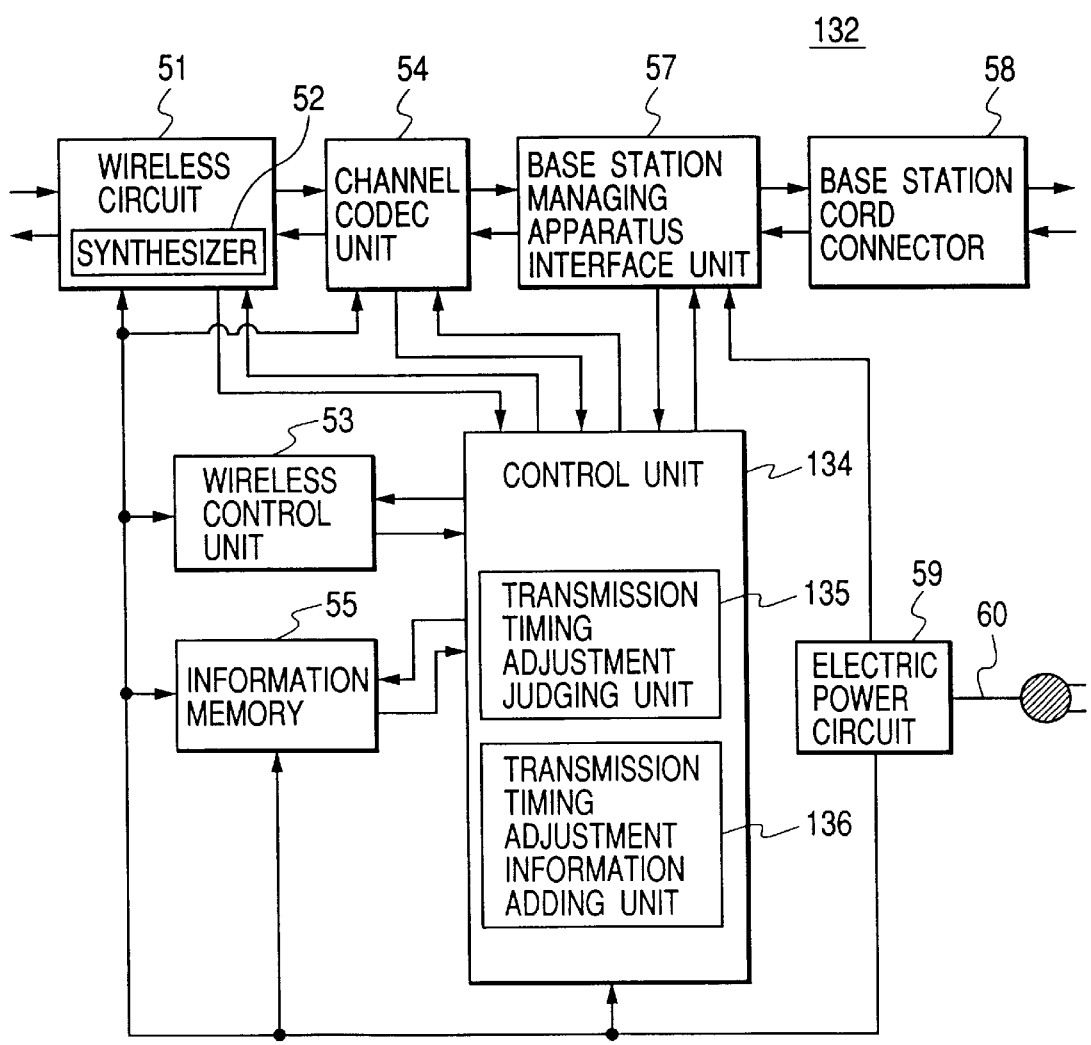
FIG. 27 is a block diagram of a wireless base station shown in FIG. 26.

FIG. 27 is a block diagram of the wireless base station 132.

As shown in FIG. 27, the wireless base station 132 comprises the wireless circuit 51 having the synthesizer 52; the wireless control unit 53; the channel codec unit 54; the information memory 55;

a control unit 134 having a transmission timing adjustment judging unit 135 and a transmission timing adjusting information adding unit 136 for controlling the wireless control unit 53, producing the incoming wireless data planned to be transmitted at the control channel, processing the outgoing wireless data transmitted at the control channel and transferred from the channel codec unit 54, analyzing a transmission timing of the outgoing wireless data in the transmission timing adjustment judging unit 135 to check whether or not the transmission timing agrees with a prescribed transmission timing, judging in the transmission timing adjustment judging unit 135 that a transmission timing adjustment is required for the transmission timing of the outgoing wireless data in cases where the transmission timing does not agree with the prescribed transmission timing, receiving the incoming call response message from the fixed subscriber unit 133, receiving the sequence interrupting signal from the base station managing apparatus 72 in response to the incoming call response message, adding the transmission timing adjusting information to the sequence interrupting signal in the transmission timing adjusting information adding unit 136 in cases where the transmission timing adjustment is performed, and outputting the sequence interrupting signal with the transmission timing adjusting information through the radio communication path;

the base station managing apparatus interface unit 57; the base station cord connector 58; the electric power circuit 59; and the electric power cord 60.

Figure 28:
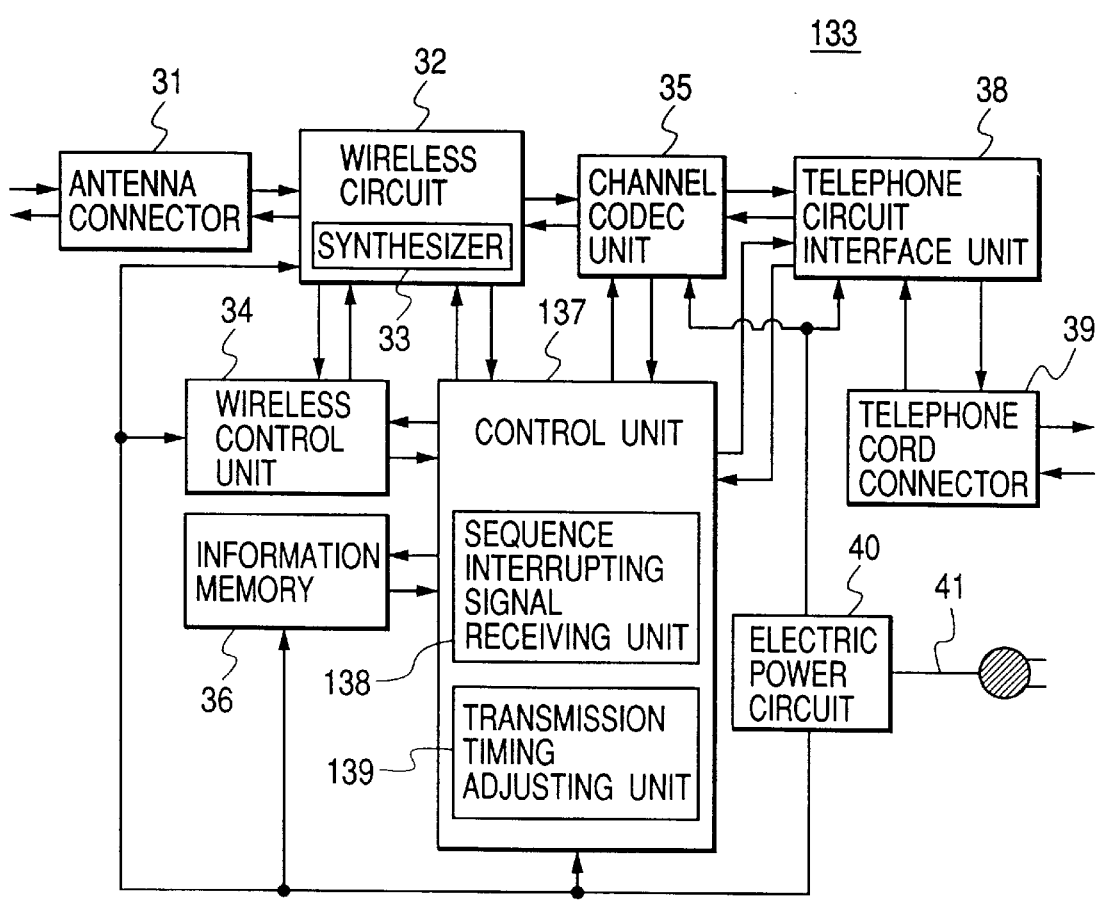
FIG. 28 is a block diagram of a fixed subscriber unit shown in FIG. 26.

FIG. 28 is a block diagram of the fixed subscriber unit 133.

As shown in FIG. 28, the fixed subscriber unit 133 comprises the antenna connector 31; the wireless circuit 32 having the synthesizer 33; the wireless control unit 34; the channel codec unit 35; the information memory 36;

a control unit 137, having a sequence interrupting signal receiving unit 138 and a transmission timing adjusting unit 139, for controlling the wireless control unit 34, processing the incoming wireless data transmitted at the control channel and transferred from the channel codec unit 35, producing the outgoing wireless data planned to be transmitted at the control channel, transmitting the outgoing wireless data to the wireless base station 132 at the transmitting timing, receiving the sequence interrupting signal with the transmission timing adjusting information in the sequence interrupting signal receiving unit 138 and adjusting the transmission timing for the outgoing wireless data according to the transmission timing adjusting information in the transmission timing adjusting unit 139; the telephone circuit interface unit 38; the telephone cord connector 39; the electric power circuit 40; and the electric power cord 41.

In the above configuration of the wireless local loop system 131, a transmission timing adjusting operation performed in a pseudo-incoming call sequence is described with reference to FIG. 29.

Figure 29:
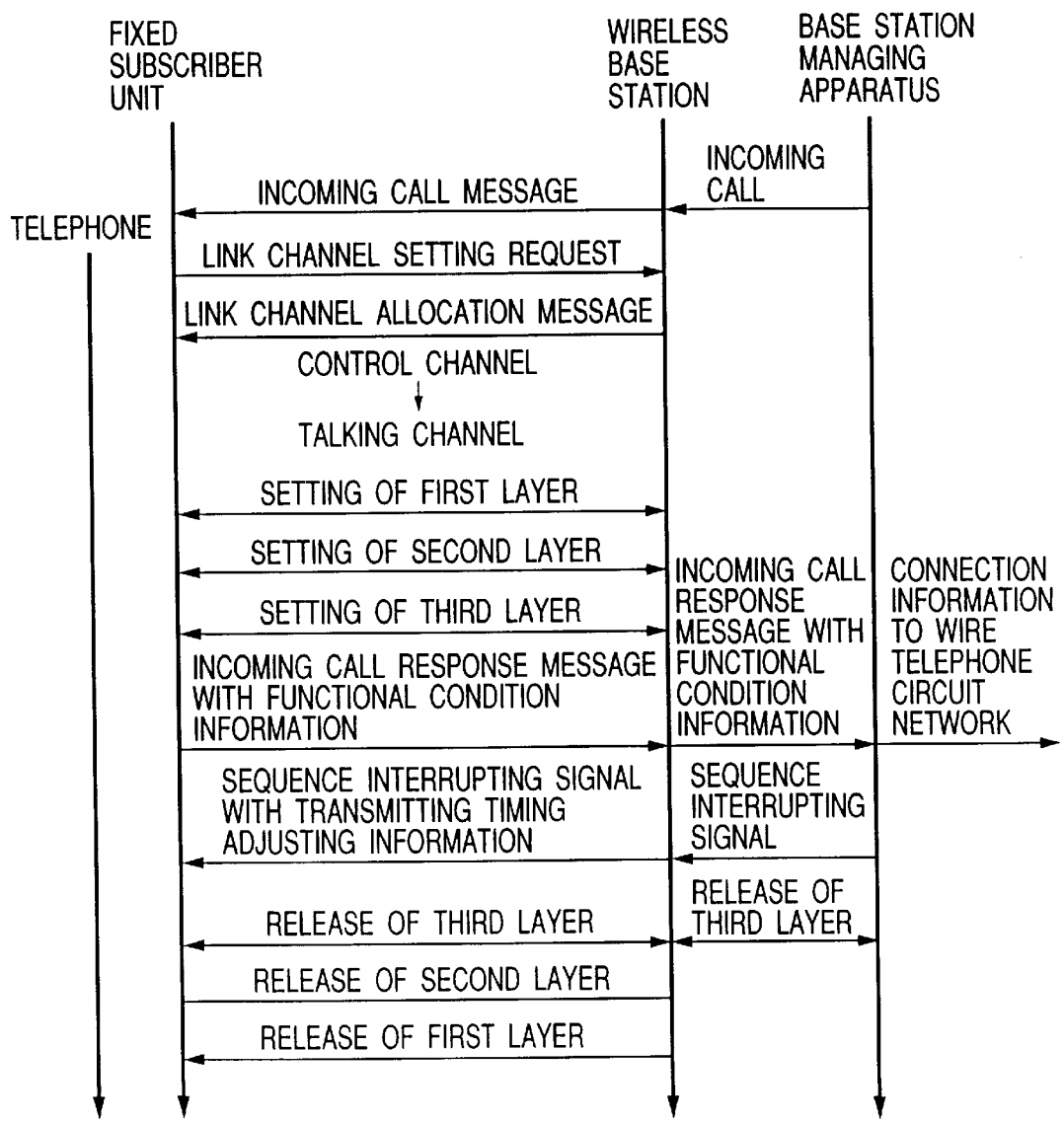
FIG. 29 shows a pseudo-incoming call sequence performed for a transmission timing adjusting operation according to the fifth embodiment.

FIG. 29 shows a pseudo-incoming call sequence performed for a transmission timing adjusting operation.

As shown in FIG. 29, a pseudo-incoming call sequence is performed in the same manner as that shown in FIG. 10, and a sequence interrupting signal is transmitted from the incoming call sequence interrupting unit 76 of the base station managing apparatus 72 to the wireless base station 132.

In cases where the fixed subscriber unit 133 is distant from the wireless base station 132, a delay correction is required for a transmission timing of the outgoing wireless data transmitted from the fixed subscriber unit 133 to the wireless base station 132. Therefore, in the transmission timing adjustment judging unit 135, the transmission timing of the outgoing wireless data is analyzed to check whether or not the transmission timing agrees with a prescribed transmission timing. In cases where the transmission timing does not agree with the prescribed transmission timing, it is judged that a transmission timing adjustment for the transmission timing of the outgoing wireless data is required.

Thereafter, transmission timing adjusting information indicating the adjustment of a transmission timing for the outgoing wireless data transmitted from the fixed subscriber unit 133 is added to the sequence interrupting signal in the transmission timing adjusting information adding unit 136 after the sequence interrupting signal is analyzed in the control unit 134 of the wireless base station 132.

Thereafter, the sequence interrupting signal with the transmission timing adjusting information is transmitted to the fixed subscriber unit 133 and is received in the sequence interrupting signal receiving unit 138, and the transmission timing for the outgoing wireless data is adjusted according to the transmission timing adjusting information in the transmission timing adjusting unit 139. Therefore, the outgoing wireless data is transmitted from the fixed subscriber unit 133 to the wireless base station 132 at an adjusted transmission timing set by the wireless base station 132.

Accordingly, the transmission timing for the outgoing wireless data transmitted from the fixed subscriber unit 133 to the wireless base station 132 can be automatically adjusted according to convenience of the wireless base station 132 without user's adjustment.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A wireless local loop system, comprising:

a telephone arranged in a house for receiving incoming telephonic information and outputting outgoing telephonic information;

a telephone circuit network for transmitting the incoming telephonic information to the telephone and transmitting the outgoing telephonic information output from the telephone to a communication partner;

a fixed subscriber unit, connected with the telephone through a telephone cord in the house, for receiving the incoming telephonic information transmitted from the telephone circuit network through a radio communication path, transferring the incoming telephonic information to the telephone through the telephone cord, receiving the outgoing telephonic information from the telephone through the telephone cord and outputting the outgoing telephonic information to the radio communication path;

a wireless base station for receiving the incoming telephonic information transmitted from the telephone circuit network, transmitting the incoming telephonic information to the fixed subscriber unit through the radio communication path, receiving the outgoing telephonic information from the fixed subscriber unit through the radio communication path and transmitting the outgoing telephonic information to the telephone circuit network; and a base station managing apparatus, connecting the wireless base station and the telephone circuit network through a wiring communication path, for transmitting the incoming telephonic information received by the wireless base station to the telephone circuit network through the wiring communication path, transmitting the outgoing telephonic information received from the telephone circuit network to the wireless base station through the wiring communication path and managing the wireless base station to make the wireless base station perform an incoming call sequence with the fixed subscriber unit and to perform a telephonic communication between the user and the communication partner, an incoming call being transmitted from the base station managing apparatus to the fixed subscriber unit through the wireless base station in the incoming call sequence, an incoming call response signal indicating the reception of the incoming call being transmitted from the fixed subscriber unit to the base station managing apparatus through the wireless base station in the incoming call sequence, an incoming call signal being transmitted from the fixed subscriber unit to the telephone in the incoming call sequence to inform the user of the incoming call, and the base station managing apparatus comprising:

pseudo-incoming call outputting means for outputting a pseudo-incoming call to the fixed subscriber unit through the wireless base station and the radio communication path to make the fixed subscriber unit output the incoming call response signal to the base station managing apparatus through the wireless base station in the same manner as in the incoming call sequence;

incoming call sequence interrupting means for outputting a sequence interrupting signal to the fixed subscriber unit through the wireless base station according to the incoming call response signal received by the base station managing apparatus to prevent the fixed subscriber unit outputting the incoming call signal to the telephone and to interrupt the incoming call sequence; and operational condition informing means for informing the telephone circuit network according to the incoming call response signal received by the base station managing apparatus that the fixed subscriber unit is normally operated to perform the telephonic communication.

2. A wireless local loop system according to claim 1 in which positions of the telephone and the fixed subscriber unit are fixed.

3. A wireless local loop system according to claim 1 in which the fixed subscriber unit comprises:

wireless control means for measuring a receive electric field level of an informative signal transmitted from the wireless base station through the radio communication path;

functional condition storing means for storing the receive electric field level measured by the wireless control means as a functional condition of the fixed subscriber unit; and incoming call response message processing means for adding the functional condition of the fixed subscriber unit stored in the functional condition storing means to the incoming call response signal which is output from the fixed subscriber unit in response to the pseudo-incoming call, the incoming call response signal with the functional condition of the fixed subscriber unit being transmitted to the base station managing apparatus through the wireless base station.

4. A wireless local loop system according to claim 1 in which the wireless base station represents a plurality of wireless base stations connected with the base station managing apparatus, a first wireless base station and a second wireless base station are included in the wireless base stations, the first wireless base station is connected with the fixed subscriber unit through the radio communication path, the base station managing apparatus further comprises base station change judging and instructing means for judging whether or not a traffic density of radio communication lines for each of the wireless base stations is high and outputting a base station change instruction to the first wireless base station to instruct the first wireless base station to refuse a radio communicative connection with the fixed subscriber unit in cases where a traffic density of radio communication lines for the first wireless base station is high, the first wireless base station comprises link channel allocation refusing means for outputting a link channel allocation refusing message indicating the refusal of the allocation of a link channel to the fixed subscriber unit according to the base station change instruction transmitted from the base station change judging and instructing means not to perform a radio communicative connection with the fixed subscriber unit in cases where a link channel setting request transmitted from the fixed subscriber unit is received in the first wireless base station, and the fixed subscriber unit comprises wireless base station capturing means for capturing the second wireless base station according to the link channel allocation refusing message transmitted from the link channel allocation refusing means to perform a radio communicative connection with the second wireless base station, a traffic density of radio communication lines for the second wireless base station being low.

5. A wireless local loop system according to claim 3 in which the wireless base station represents a plurality of wireless base stations connected with the base station managing apparatus, a first wireless base station and a second wireless base station are included in the wireless base stations, the first wireless base station is connected with the fixed subscriber unit through the radio communication path, the base station managing apparatus further comprises base station change judging and instructing means for judging whether or not the functional condition of the fixed subscriber unit stored in the functional condition storing means is excellent and outputting a base station change instruction to the first wireless base station to instruct the first wireless base station to refuse a radio communicative connection with the fixed subscriber unit in cases where the functional condition of the fixed subscriber unit is not excellent, the first wireless base station comprises link channel allocation refusing means for outputting a link channel allocation refusing message indicating the refusal of the allocation of a link channel to the fixed subscriber unit according to the base station change instruction transmitted from the base station change judging and instructing means not to perform a radio communicative connection with the fixed subscriber unit in cases where a link channel setting request transmitted from the fixed subscriber unit is received in the first wireless base station, and the fixed subscriber unit comprises wireless base station capturing means for capturing the second wireless base station according to the link channel allocation refusing message transmitted from the link channel allocation refusing means to perform a radio communicative connection with the second wireless base station, a traffic density of radio communication lines for the second wireless base station being low.

6. A wireless local loop system according to claim 1 in which the wireless base station represents a plurality of wireless base stations connected with the base station managing apparatus, a first wireless base station and a second wireless base station are included in the wireless base stations, the first wireless base station is connected with the fixed subscriber unit through the radio communication path, the base station managing apparatus further comprises base station change judging and instructing means for judging during a conversation between a user of the fixed subscriber unit and a communication partner whether or not a traffic density of radio communication lines for the first wireless base station is high and outputting a base station change instruction and identification information of the second wireless base station to the first wireless base station to instruct the first wireless base station to make the fixed subscriber unit change a radio communicative connection with the fixed subscriber unit to a radio communicative connection with the second subscriber unit in cases where a traffic density of radio communication lines for the first wireless base station is high, the first wireless base station comprises link channel setting instruction outputting means for outputting a link channel setting instruction and the identification information indicating the setting of a link channel with the second wireless base station to the fixed subscriber unit according to the base station change instruction and the identification information transmitted from the base station change judging and instructing means, and the fixed subscriber unit comprises radio communicative connection setting means for setting a radio communicative connection with the second wireless base station according to the link channel setting instruction and the identification information transmitted from the link channel setting instruction outputting means and disconnecting the first wireless base station from the fixed subscriber unit according to the link channel setting instruction.

7. A wireless local loop system according to claim 3 in which the wireless base station represents a plurality of wireless base stations connected with the base station managing apparatus, a first wireless base station and a second wireless base station are included in the wireless base stations, the first wireless base station is connected with the fixed subscriber unit through the radio communication path, the base station managing apparatus further comprises base station change judging and instructing means for judging during a conversation between a user of the fixed subscriber unit and a communication partner whether or not the functional condition of the fixed subscriber unit stored in the functional condition storing means is excellent and outputting a base station change instruction and identification information of the second wireless base station to the first wireless base station to instruct the first wireless base station to make the fixed subscriber unit change a radio communicative connection with the fixed subscriber unit to a radio communicative connection with the second subscriber unit in cases where the functional condition of the fixed subscriber unit is not excellent, the first wireless base station comprises link channel setting instruction outputting means for outputting a link channel setting instruction and the identification information indicating the setting of a link channel with the second wireless base station to the fixed subscriber unit according to the base station change instruction and the identification information transmitted from the base station change judging and instructing means, and the fixed subscriber unit comprises radio communicative connection setting means for setting a radio communicative connection with the second wireless base station according to the link channel setting instruction and the identification information transmitted from the link channel setting instruction outputting means and disconnecting the first wireless base station from the fixed subscriber unit according to the link channel setting instruction.

8. A wireless local loop system according to claim 1 in which the outgoing telephonic information is output from the fixed subscriber unit to the wireless base station at a transmission timing, the wireless base station comprises transmission timing adjusting information adding means for adding transmission timing adjusting information indicating the adjustment of the transmission timing for the outgoing telephonic information to the sequence interrupting signal output from the incoming call sequence interrupting means, and the fixed subscriber unit comprises transmission timing adjusting means for adjusting the transmission timing for the outgoing telephonic information according to the transmission timing adjusting information transmitted from the transmission timing adjusting information adding means with the sequence interrupting signal.

\* \* \* \* \*